United States Patent Office 2,784,183
Patented Mar. 5, 1957

2,784,183

FLUORESCENT MONOTRIAZOLE COMPOUNDS

Ernst Keller, Binningen, and Reinhard Zweidler and Heinrich Hausermann, Basel, Switzerland, assignors to J. R. Geigy A. G., Basel, Switzerland, a Swiss firm No Drawing. Application December 13, 1954, Serial No. 474,994

Claims priority, application Switzerland September 6, 1951

7 Claims. (Cl. 260—240)

The present invention concerns water soluble, blue fluorescing monotriazole compounds the salts of which have an affinity to various types of textile fibres in aqueous solution, in particular to cellulose, polyamide and polyurethane fibres. Due to their blue fluorescence in daylight, in their adsorbed condition on these fibres they act as optical brightening agents.

It has been found that such mononaphthotriazole compounds are valuable agents for brightening cellulosic material and synthetic polyamide fibres from an aqueous solution, which in the 2-position of the 1.2.3-triazole ring, contain a substituted 4-stilbyl radical and which contain groups, preferably in the form of their salts, which dissociate acid in water. Such compounds correspond to the general Formula I

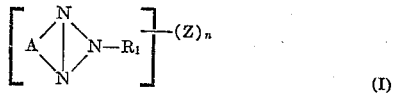

In this formula A represents a naphthalene radical, two vicinal carbon atoms of which form a part of the 1.2.3-triazole ring, Z represents a salt-forming substituent having an acid reaction in water, $R_1$ represents a 4-stilbyl radical which is substituted in at least one of the ortho-positions or in the para-position with regard to the ethylene bridge preferably with Z, and $n$ represents a whole number from 1 to 3, whereby A and $R_1$ must be free from groups imparting dyestuff characteristics. Particularly valuable and technically easily available 1.2.3-triazole compounds according to the present invention correspond to the general Formula II

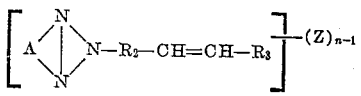

wherein A, Z and $n$ have the meanings given above, $R_2$ represents a sulphonated p-phenylene radical with a sulphonic acid group in the ortho-position to the ethylene bridge and $R_3$ represents a radical of the benzene series, possibly further substituted and the aromatic rings must be free from groups imparting dyestuff characteristics. As such, chromophoric groups such as, e. g. the nitro or the arylazo group as well as the auxochromes which enable the diazo coupling to take place in isocyclic-aromatic rings, namely aromatically bound hydroxyl groups, primary, secondary and tertiary amino groups are excluded as substituents.

As salt forming groups corresponding to Z which dissociate acid in water are suitable: in the first place, the sulphonic acid group, then the carboxyl group and also acylated sulphamide groups, i. e. the acyl sulphimide groups of the formula —$SO_2$—NH—Y, wherein Y represents an aliphatic or aromatic acyl radical, e. g. the radical of an organic sulphonic acid or of a carboxylic acid. Y, for example, can represent the methyl sulphonyl, chloromethyl sulphonyl, ethyl sulphonyl, benzene sulphonyl, p-methylbenzene sulphonyl, p-chlorobenzene sulphonyl radical, a fatty acid radical such as, e. g. the acetyl, propionyl, dimethyl acryl radical, or an aroyl radical such as, e. g. the benzoyl, p- or o-chlorobenzoyl radical.

In the compounds according to the present invention corresponding to the general Formula I, the aromatic rings can contain, apart from Z, the following further substituents:

(a) Halogens, e. g. fluorine, chlorine, bromine or also, possibly, iodine, (b) Alkyl groups, e. g. methyl, ethyl, isopropyl, tertiary butyl or amyl groups, including the substituted alkyl groups such as, e. g. the benzyl groups, benzyl groups substituted in the ring, halogen alkyl groups such as, e. g. trifluoromethyl groups, also vicinally bound alkylene groups, e. g. the tetramethylene group

—$CH_2$—$CH_2$—$CH_2$—$CH_2$—

(c) Phenyl groups including those substituted in the ring such as alkyl phenyl, alkoxy phenyl or halogen phenyl groups, (d) Ether groups, in particular alkoxy and phenoxy groups such as, e. g. methoxy, ethoxy, butoxy, phenoxy groups and phenoxy groups substituted in the ring, including ether groups bound in the form of a ring such as e. g. the vicinally bound dioxymethylene group —O—$CH_2$—O—, or the group —O—$CH_2$—O—$CH_2$—, possibly also thioether groups, e. g. the methyl mercapto, ethyl mercapto or phenyl mercapto groups, further, also possibly substituted alkoxy groups, e. g. β-hydroxyethoxy, β-methoxy-ethoxy, β-ethoxy-ethoxy or a polyglycol ether group.

(e) Sulphonyl groups of the general formula —$SO_2$—Q wherein Q represents an aliphatic, araliphatic or aromatic radical such as the methyl, ethyl, butyl, vinyl, benzyl, phenyl, p-methylphenyl, 2.4-dimethylphenyl, p-chlorophenyl sulphonyl group, (f) Modified sulphonic acid groups, in particular sulphonic acid amide groups including those organically substituted at the nitrogen atom, e. g. the sulphonic acid amide, -methyl amide, -dimethyl amide, -diethyl amide, -dibutyl amide, -dibenzyl amide, -phenyl amide, -N-methylphenyl amide, -N-ethylphenyl amide, -piperidide, -morpholide group, also the sulphonic acid ester groups, preferably the stable sulphonic acid arylester groups such as, e. g. the sulphonic acid phenyl ester, -o-, -m- or -p-cresyl ester, p-chlorophenyl ester group, (g) Modified carboxyl groups, e. g. carboxylic acid ester, carboxylic acid amide and nitrilo groups, (h) Acylamino groups, e. g. the acetylamino or the benzoylamino group, (i) Esterified hydroxyl groups, e. g. the

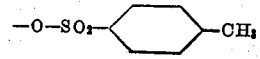

group.

The type and position of the substituents in the naphthalene ring A is of less importance and only affects the shade of the emitted fluorescence to a slight extent. "A" need not be further substituted, or can it contain acid salt forming groups Z in particular the sulphonic acid group and, possibly, also the carboxyl group. Also halogen, alkoxy, acylamino, sulphonic acid amide groups are possible substituents in the naphthalene radical A. The substitution of the stilbene radical which, according to the definition must always be substituted in at least one of the o- or p-positions to the ethylene bridge, is more critical because analogous compounds with an unsubstituted stilbene radical fluoresce either not at all or only so weakly that they are of no technical use as optical brightening agents. In the blue fluorescing naphthotriazole compounds according to this invention which are suitable as optical brightening agents for cellulose fibres, preferably a salt forming substituent Z which dissociates acid occupies one of the o-positions to the ethylene bridge of the stilbene radical, in particular a sulphonic acid group. In the p-position to the ethylene bridge this also has a favourable effect on the fluorescence. Blue fluorescent naphthotriazole compounds which are suitable for the brightening of cellulose fibres are also obtained if one of the negative substituents listed above or a halogen atom occupies an o-position to the ethylene bridge instead of Z. Examples are a sulphonyl group —$SO_2$—Q, a modified sulphonic acid group or carboxylic acid group such as the acid ester or the acid amide groups or the nitrilo group. In contrast to this, groups with a strong positive action, in particular in the o-position to the ethylene bridge of the stilbene radical such as, e. g. the alkoxy groups, shift the shade of the fluorescent light strongly towards the green-blue spectral range. Such naphthotriazole compounds according to this invention which have a green-blue fluorescence are very active in increasing the white content of polyamide and polyurethane fibres. If an o-position to the stilbene bridge of the stilbene radical in the 2-stilbyl-naphthotriazole compounds according to the present invention is occupied, then further substituents can take any other positions desired.

The new 2-stilbyl-naphthotriazole compounds can be obtained by various methods. Of particular technical interest is the coupling of diazotised 4-aminostilbene compounds with aminonaphthalene compounds coupling in the neighbouring position to an amino group to form the corresponding o-aminoazo dyestuffs which are oxidised by methods known per se to form the 1.2.3-triazole compounds. In this method the components are so chosen that the end product fulfils the conditions of the definition, i. e. it contains acid salt forming groups Z, a substituent in the o- or p-position to the ethylene bridge but no chromophore groups and aromatically bound hydroxyl and amino groups. If necessary, inadmissible substituents present in the end product as a result of this reaction can often easily be eliminated later for example by reducing nitro or arylazo groups to amino groups, acylating or diazotising these and replacing the diazo group by hydrogen, halogens or the nitrile group, or by etherifying or esterifying aromatically bound hydroxyl groups.

The use of diazotised 4-aminostilbene sulphonic acids in this production process is particularly favourable. The 4-aminostilbene-2-sulphonic acids are technically easily available. They can be produced in a simple manner from the 4-nitrostilbene-2-sulphonic acid aryl esters obtained according to the method of the American patent specification No. 2,657,228 by saponification of the arylester group and reduction of the nitro group to the amino group whilst the benzene rings can be further substituted, e. g. by halogen, alkyl, phenyl, alkoxy, alkylsulphonyl, sulphonic acid amide groups. The 4-aminostilene-2.2'-disulphonic acids are also easily available technically, e. g. the 4-amino-4'-acylaminostilbene-2.2'-disulphonic acids, the 4-amino-4'-nitrostilbene-2.2'-disulphonic acid and compounds obtainable therefrom by diazotisation and replacement of the diazonium group by hydrogen, halogens or the cyano group and reduction of the nitro group to the amino group. Further 4-aminostilbene compounds usable in the process described are obtained for example according to the following methods:

(a) By reduction of the nitro to the amino group in stilbene compounds obtained by condensation according to Thiele's method in the presence of piperidine of such 4-nitrotoluene compounds which contain an electrophilic group in the 2-position, e. g. a sulphonic acid aryl ester, a sulphonic acid amide, an alkyl or arylsulphonyl, a cyano or a carboxylic group, with benzaldehyde and reactive derivatives thereof. The benzaldehyde for example can be substituted in the ring by alkyl, phenyl, alkoxy, sulphonic acid amide, alkyl sulphonyl, sulphonic acid arylester groups and by halogen.

(b) By reduction of the o-nitro group to the amino group in the 2.4-dinitrostilbenes which are particularly easily available according to Thiele's method from 2.4-dinitrotoluenes and benzaldehydes which can possibly be substituted in the ring, diazotisation of the amino group and replacement of the diazo group by hydrogen in boiling alcohol or by halogen or a cyano group according to Sandmeyer in the presence of copper salts and reduction of the p-nitro group to the amino group.

(c) From diazotised p-nitroanilines, possibly further substituted, and cinnamic acids which may be substituted in the ring according to Meerwein's method and reduction of the nitro to the amino group in the stilbenes obtained while splitting off nitrogen and carbonic acid.

(d) By condensation of suitably substituted aldehydes and phenylacetic acids according to Pschorr while splitting off carbonic acid, whilst the one component contains a substituent which can be converted into a primary amino group in the p-position to the substituent to be condensed, e. g, a nitro or an acylamino group and a further admissible substituent must be present in a suitable position.

A few examples are listed below of 4-aminostilbene compounds which can be used in the process described but which in no way limit the invention: 4-aminostilbene-2-sulphonic acid, 4-amino-2'- or -4'-chlorostilbene-2-sulphonic acid, 4-amino-2'- or -4'-bromostilbene-2-sulphonic acid, 4-amino-4'-fluorostilbene-2-sulphonic acid, 4-amino-4'-methylstilbene-2-sulphonic acid, 4-amino-2'.4'-dimethylstilbene-2-sulphonic acid, 4-amino-2'.6'-dichlorostilbene-2-sulphonic acid, 4-aminostilbene-2'- or -4'-isopropylstilbene-2-sulphonic acid, 4-amino-4'-chlorostilbene-2.2'-disulphonic acid, 4-amino-4'-bromostilbene-2.2'-disulphonic acid, 4-amino-4'-cyanostilbene-2.2'-disulphonic acid, 4-aminostilbene-2.2'-disulphonic acid, 4-amino-2'- or -4'-methylsulphonylstilbene-2-sulphonic acid 4-amino-2'- or -4'-methoxy- or -ethoxy-stilbene-2-sulphonic acid, 4-amino-4'-phenoxystilbene-2-sulphonic acid, 4-amino-4'-benzyloxystilbene-2-sulphonic acid, 2-cyano-4-aminostilbene, 2-carboxy-4-aminostilbene, 2-sulphonic acid phenyl- -o- or -p-cresylester-4-aminostilbene, 2-methylsulphonyl-, 2-ethylsulphonyl-, 2-vinylsulphonyl-, 2-butylsulphonyl-4-aminostilbene, 2-p-toluylsulphonyl- or 2-(2'.4'- or 3'.4'-xylylsulphonyl)-4-aminostilbene, 4-aminostilbene-2-sulphonic aicd dimethyl- or diethyl-amide, 2-methyl-4-aminostilbene-2'- or -4'-sulphonic acid, 2-fluoro- or 2-chloro-4-aminostilbene-2'- or -4'-sulphonic acid, 2-methoxy- or 2-ethoxy-4-aminostilbene-2'- or -4'-sulphonic acid, 4-aminostilbene-2'-sulphonic acid, 4-amino-2'-chlorostilbene-5'-sulphonic acid, 4-aminostilbene-4'-sulphonic acid, 4-amino-2'- or -4'-methylsulphonyl- or -ethylsulphonyl-stilbene, 4-aminostilbene-2'- or -4'-sulphonic acid-dimethyl- or -diethyl-amide, 6-methyl-4-aminostilbene-2-sulphonic acid, 6-chloro-4-aminostilbene-2-sulphonic acid, 4-aminostilbene-2-sulphonic acid acetimide, 4-aminostilbene-2-sulphonic acid benzoylimide, 4-aminostilbene-2-sulphonic acid methyl sulphimide, 4-aminostilbene-2-sulphonic acid benzene sulfimide, 4-aminostilbene-2-sulphonic acid p-chloro- or -p-methylbenzene sulphimide.

The 4-aminostilbene compounds usable according to the present invention are diazotised either direct or indirect according to the substitution. Indirect diazotisation is performed by the dropping of an aqueous solution of the alkali salts which contains sodium nitrite into cold mineral acids. Direct diazotisation is performed with alkali nitrite or nitrosyl sulphuric acid in the presence of inert organic or inorganic solvents and mineral acid. Low alcohols, fatty acids or ketones or concentrated sulphuric acid are suitable as inert solubility promoters.

Preferably 2-aminonaphthalene compounds coupling in the 1-position such as 2-naphthylamine and the sulphonic acids thereof are suitable as azo components of the naphthalene series coupling in the o-position to the amino group. Also suitable are the carboxylic acids and the sulphonated carboxylic acids, in addition the 1-aminonaphthalene compounds coupling in the 2-position with occupied or hindered 4-position, in particular the corresponding sulphonic acids. Halogens, alkyl, aralkyl, alkoxy, acylamino and sulphonic acid amide groups are examples of further substituents which are admissible in the naphthalene radical. It is of advantage to perform the coupling in a weakly acid medium, for example in the presence of fatty acid alkali salts such as sodium acetate to buffer the mineral acid. In the production of the naphthotriazole compounds derived from 2-aminonaphthalene, which are particularly suitable as additives for washing and cleansing agents, the use of the harmless 2-aminonaphthalene-1-sulphonic acid as coupling component instead of the carcinogenic 2-aminonaphthalene has proved particularly valuable. In this coupling component, the sulphonic acid group is easily replaced by the stilbylazo group at slightly raised temperatures. The coupling with the diazotised 4-aminostilbene compound is performed advantageously at temperatuers of, for example 40 to 70° C. with the addition of stabilisers for the diazo compound, e. g. with the addition of naphthalene sulphonic acid or of tetraline sulphonic acid or the alkali salts thereof.

The o-aminoazo dyestuffs are oxidised to form the 1.2.3-triazole compound according to methods known per se, either with alkali hypochlorites or with cupritetrammine sulphate and air in aqueous or aqueous-pyridine solution.

The raw 2-stilbyltriazole compounds are purified advantageously with reducing agents such as alkali hydrosulphite or possibly they can be de-coppered with alkali sulphides and then recrystallised from water or organic-aqueous mixtures of solvents.

In the form of their alkali salts, the new 2-stilbyl-naphthotriazole compounds are in the form of pale yellow powders which dissolve in water to form more or less light to practically colourless solutions according to the composition and which in ultraviolet light form violet-blue to green-blue fluorescing solutions. The affinity to cellulose, superpolyamide and superpolyurethane fibres, which in some cases is great and in others not so great, is dependent on their substitution. Even in the very slight concentrations usual, these compounds give a more white appearance in daylight to the above named fibres which effect is distinguished by its remarkably good stability to oxidation agents such as are generally used for example in the chemical bleaching of cellulose fibres.

The new 2-stilbylnaphthotriazole compounds can be incorporated into soap or synthetic washing agents. They can be used in washing or rinsing liquors or also in chemical bleaching liquors containing hypochlorite as they are distinguished by good fastness to chlorine.

The following examples illustrate the invention without limiting it in any way. Where not otherwise stated, parts are given as parts by weight and the temperatures are in degree centigrade. The relationship of parts by weight to parts by volume is as that of kilogrammes to litres.

*Example 1*

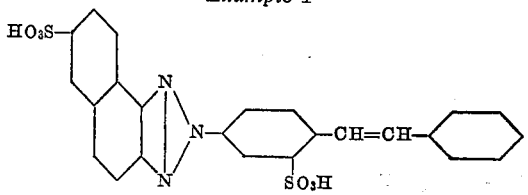

A solution of 27.5 parts of 4-aminostilbene-2-sulphonic acid, 4.1 parts of sodium hydroxide and 6.9 parts of sodium nitrite in 200 parts of water are indirectly diazotised at 8–10° with 25 parts of concentrated hydrochloric acid. The diazo compound in the form of a suspension is mixed with a solution of 22.3 parts of 2-aminonaphthalene-6-sulphonic acid, 4.1 parts of sodium hydroxide and 25 parts of crystallised sodium acetate in 170 parts of water at 10–12° and on completion of the coupling, the o-aminoazo dyestuff is filtered off at 30°. The o-aminoazo dyestuff is pasted in 750 parts of hot water and 12 parts of sodium hydroxide and 115 parts of a solution of sodium hypochlorite which contains 17% active chlorine are added dropwise at 70–75° within 30 minutes. On complete oxidation of the dyestuff which can be seen by the change in colour of the solution from red to orange, the solution is cooled, the 2-stilbyl-naphthotriazole compound is precipitated by the addition of common salt, filtered off, washed with diluted salt solution and dried at 50–60°. The sodium salt of 2-(stilbyl-4″)-(naphtho-1′.2′:4.5) - 1.2.3-triazole-2″.6′-disulphonic acid is obtained in the form of a pale yellow coloured powder which dissolves well in water. Due to its substantivity, cellulose fibres treated with it are given a pure blueish-white shade which has good fastness properties, particularly a good fastness to chlorine. The treatment bath can contain active chlorine without loss of the optical effect and also an after-treatment of the brightened cellulose fibres with active chlorine does not injure the white shading. The new compound can also be used in soaps and synthetic washing agents to which it gives an improve white appearance in daylight.

*Example 2*

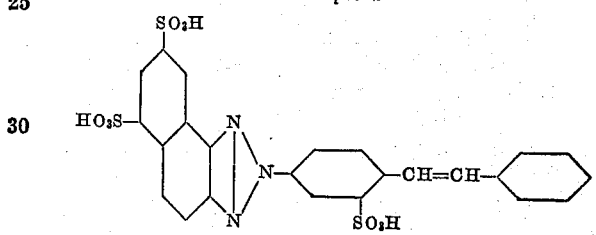

27.5 parts of 4-aminostilbene-2-sulphonic acid are indirectly diazotised as described in Example 1 and the suspension of the diazo compound is coupled with a solution of 30.3 parts of 2-aminonaphthalene-5.7-disulphonic acid, 8.2 parts of sodium hydroxide and 25 parts of crystallised sodium acetate in 150 parts of water. On completion of the coupling, the dyestuff is salted out and isolated. The damp o-aminoazo dyestuff is then dissolved in 500 parts of water with the addition of 12 parts of sodium hydroxide and oxidised at 70–80° with 115 parts of a 17% sodium hypochlorite solution. The 2-stilbyl-naphthotriazole compound is salted out, isolated and dried. The sodium salt of 2-(stilbyl-4″)-(naphtho-1′.2′:4.5)-1.2.3-triazole-2″.5′.7′-trisulphonic acid is a yellowish coloured powder. It has similar optical properties on cellulose fibres to the product described in Example 1 but is, however, less fast to washing.

A product with almost the same properties is obtained if, in the above example, 30.3 parts of 2-aminonaphthalene-3.6-disulphonic acid are used instead of 2-aminonaphthalene-5.7-disulphonic acid. The sodium salt of 2-(stilbyl-4″) - (naphtho-1′.2′:4.5)-1.2.3-triazole-2″.3′.6′-trisulphonic acid is obtained by oxidation of the o-aminoazo dyestuff.

*Example 3*

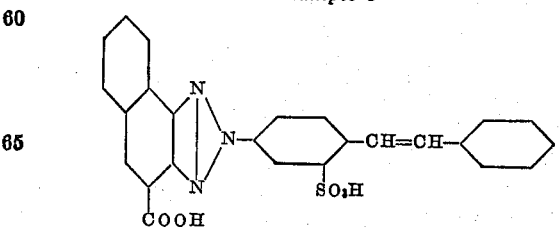

The diazo suspension obtained from 27.5 parts of 4-aminostilbene-2-sulphonic acid according to Example 1 is coupled at 10–12° with a solution of 18.7 parts of 2-aminonaphthalene-3-carboxylic acid, 4.1 parts of sodium hydroxide and 25 parts of crystallised sodium acetate in 300 parts of water. The o-aminoazo dyestuff is isolated, dissolved in 600 parts of warm pyridine and 12 parts of sodium hydroxide in 20 parts of water and a few drops of Turkey red oil are added. 152 parts of a 17% sodium hypochlorite solution are added dropwise at 65–75° within half an hour and the whole is stirred until the dyestuff has completely disappeared. The whole is allowed to cool, and the aqueous layer is removed. By the addition of 100 parts of water and 10 parts of sodium hydroxide the pyridine is distilled off with steam and the 2-stilbyl-naphthotriazole compound remains in the residue as a light yellow substance. The still warm mother liquor is removed by filtration and the residue is washed with a little warm water and dried at 50–60°. The sodium salt of 2-(stilbyl-4″)-(3′-carboxynaphtho-1′.2′:4.5)-1.2.3-triazole-2″-sulphonic acid is obtained as a pale yellow powder. The compound causes a blueish white shading on cellulose fibres which has excellent fastness to chlorine and good fastness to light and wet. The product also gives a whiter appearance in daylight to soaps and synthetic washing agents.

*Example 4*

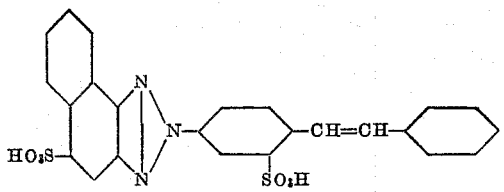

27.5 parts of 4-aminostilbene-2-sulphonic acid are indirectly diazotised as described in Example 1 and the diazo compound is coupled with a solution of 22.3 parts of 1-aminonaphthalene-4-sulphonic acid, 4.1 parts of sodium hydroxide and 25 parts of crystallised sodium acetate in 170 parts of water. The o-aminoazo dyestuff so formed is isolated, completely dissolved at 90–95° in water with the addition of 20 parts of 25% ammonia. 60 parts of crystallised copper sulphate in 240 parts of water and 120 parts of 25% ammonia are then added to the mixture. The whole is then kept at a temperature of 92–95° until the o-aminoazo dyestuff has completely disappeared and then cooled whereupon, on the addition of common salt, the 2-stilbyl-naphthotriazole compound precipitates. The raw product is dissolved in hot water in the presence of excess sodium sulphide, the copper sulphide obtained is filtered off, the excess alkali sulphide compound is decomposed with hydrochloric acid and the product is purified by recrystallisation from water. The sodium salt of 2-(stilbyl-4″)-(naphtho-1′.2′:4.5)-1.2.3-triazole-4′.2″-disulphonic acid is obtained as a pale yellowish substance. This compound produces a strong white shading on cellulose fibres which has similar properties to the product described in Example 1 but also a more greenish shade.

If, in the above example, instead of 1-aminonaphthalene-4-sulphonic acid, 22.3 parts of 2-aminonaphthalene-5-sulphonic acid are used, the sodium salt of 2-(stilbyl-4″) - (naphtho-1′.2′:4.5)-1.2.3-triazole-2″.5′-disulphonic acid is obtained. This product has a more reddish shade than the substance described in Example 1, but otherwise it has similar properties. The 1-aminonaphthalene-4-sulphonic acid in the above example can also be replaced by 22.3 parts of 2-aminonaphthalene-7-sulphonic acid. The sodium salt of 2-(stilbyl-4″)-(naphtho-1′.2′:4.5)-1.2.3-triazole-2″.7′-disulphonic acid is obtained by oxidation of the o-aminoazo dyestuff. It produces a very strong white shading on the fibre and, apart from a somewhat more greenish-blue shade, it otherwise has the same properties as the product described in Example 1.

This o-aminoazo dyestuff can also be oxidised by means of a solution of sodium hypochlorite instead of copper tetrammine sulphate as described in Example 1. Identical compounds with the same optical effect are obtained.

*Example 5*

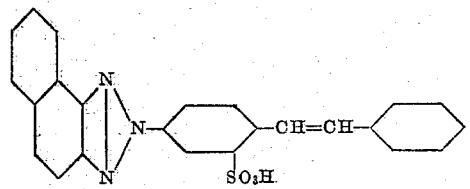

14.3 parts of 2-aminonaphthalene are dissolved hot with 10 parts of concentrated hydrochloric acid in 350 parts of water. The 40–50° warm solution is added dropwise to a well cooled diazo suspension of 27.5 parts of 4-aminostilbene-2-sulphonic acid according to Example 1. The temperature is kept at 10–12° while a solution of 40 parts of crystallised sodium acetate in 100 parts of water is added slowly. It is advantageous to add also a capillary active disperser, or, after a few hours, 2–2.5% pyridine as solubility promoter. On completion of the coupling, the o-aminoazo dyestuff is isolated and washed. The damp product is dissolved in 200 parts of warm pyridine and a solution of 12 parts of sodium hydroxide in 20 parts of water and a few drops of Turkey red oil are added, at 60–65°, 150–190 parts of a 17% solution of sodium hypochlorite are added within 30 minutes and after some time, part of the oxidation product begins to precipitate in crystalline form. The temperature is raised to 70–75° to complete the oxidation. On completion of the oxidation, the mixture is cooled, the aqueous layer is removed from the pyridine triazole suspension and 8 parts of sodium hydroxide in 20 parts of water are added to the latter. The pyridine is evaporated with steam. In order to obtain a very light end product, a reducing agent, e. g. 2–5 parts of sodium hydrosulphite, may be added at the beginning of the steam distillation. On completion of the steam distillation, the 2-stilbyl-naphthotriazole compound in the form of yellowish crystalline needles is filtered off while still warm. The product is washed with water until the filtrate is clear and the sodium salt of 2-(stilbyl-4″)-(naphtho-1′.2′:4.5)-1.2.3-triazole-2″-sulphonic acid is dried at 50–60°. This compound is a greenish yellow powder and is a valuable brightening agent for cellulose fibres. While having good fastness properties, the white shading attained therewith has a blue-white shade and is excellently fast to chlorine. The product can also be used as brightening agent for soaps and synthetic washing agents and gives them and also the textiles treated therewith a whiter appearance.

A compound with a very similar action is obtained if the 2-aminonaphthalene is replaced by 17.3 parts of 2-amino-6-methoxynaphthalene, 2-(stilbyl-4″)-(6′-methoxynaphtho-1′.2′:4.5)-1.2.3-triazole-2″-sulphonic acid is obtained by oxidation of the so obtained o-aminoazo dyestuff.

If in the above example, 2-aminonaphthalene is replaced by 17.3 parts of 2-amino-7-methoxynaphthalene, 2 - (stilbyl - 4″)-(7′-methoxynaphtho-1′.2′:4.5)-1.2.3-triazole-2″-sulphonic acid is obtained. The product has very similar properties to those of the compounds described above.

*Example 6*

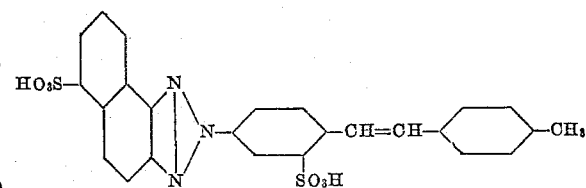

28.9 parts of 4-amino-4′-methylstilbene-2-sulphonic acid are dissolved in 400 parts of water with 4.1 parts of sodium hydroxide. 6.9 parts of sodium nitrite are added and the whole is indirectly diazotised at 8–10° with 22 parts of concentrated hydrochloric acid. The diazo compound in the form of a suspension is coupled with a solution of 22.3 parts of 2-aminonaphthalene-5-sulphonic acid, 4.1 parts of sodium hydroxide and 25 parts of crystallised sodium acetate in 200 parts of water at 10-12°. The o-aminoazo dyestuff is oxidised to the triazole as described in Example 1. The sodium salt of 2-(4'''-methyl-stilbyl-4'')-(naphtho - 1'.2':4.5) - 1.2.3-triazole-2''.5'-disulphonic acid is obtained as a pale yellowish powder. The product is a valuable brightening agent and has properties similar to those of the compound described in Example 1.

Equally well acting but somewhat more bluish products are obtained if in the above example the 2-aminonaphthalene-5-sulphonic acid is replaced by 14.3 parts of 2-aminonaphthalene or 22.3 parts of 2-aminonaphthalene-6-sulphonic acid.

*Example 7*

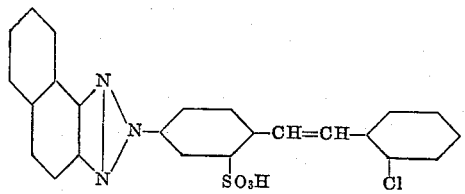

31 parts of 4-amino-2'-chlorostilbene-2-sulphonic acid are dissolved in 500 parts of water with 4.1 parts of sodium hydroxide and, as described in Example 1, indirectly diazotised at 8-10°. A warm solution of 14.3 parts of 2-aminonaphthalene and 10 parts of concentrated hydrochloric acid in 200 parts of water are added dropwise to the diazo suspension at 10-12°. Finally a solution of 40 parts of crystallised sodium acetate in 100 parts of water is slowly added. On completion of the coupling, the o-aminoazo dyestuff is isolated, dissolved in 300 parts of warm pyridine and as described in Example 5, oxidised to the triazole with sodium hypochlorite solution. The sodium salt of 2-(2'''-chlorostilbyl-4'')-(naphtho-1'.2':4.5)-1.2.3-triazole-2''-sulphonic acid is obtained as a pale yellowish substance. It is a valuable brightening agent for cellulose fibres, for soap powders and washing auxiliary agents.

Products with a similar action are obtained if in place of 4-amino-2'-chlorostilbene-2-sulphonic acid, 31 parts of 4-amino-4'-chlorostilbene-2-sulphonic acid are used. 2 - (4''' - chlorostilbyl - 4'') - (naphtho-1'.2':4.5)-1.2.3-triazole-2''-sulphonic acid is then obtained. Also in the above example, the 2-aminonaphthalene may be replaced by 22.3 parts of 2-aminonaphthalene-6-sulphonic acid. By oxidation of the o-aminoazo dyestuff, 2-(2'''-chloro-stilbyl - 4'') - (naphtho-1'.2':4.5) - 1.2.3-triazole-2''.6'-disulphonic acid is obtained. Further, the 4-amino-2'-chlorostilbene-2-sulphonic acid may be replaced by 34.6 parts of 4-amino-2'.6'-dichlorostilbene-2-sulphonic acid. All these products are pale yellow substances and are valuable brightening agents for cellulose fibres, soap powders and washing auxiliary agents.

*Example 8*

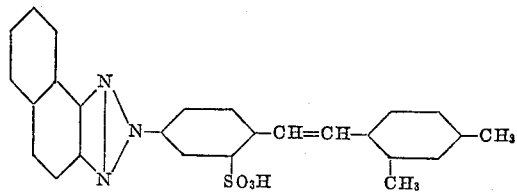

30.3 parts of 4-amino-2'.4'-dimethylstilbene-2-sulphonic acid are dissolved in 300 parts of water with 4.1 parts of sodium hydroxide and indirectly diazotised at 8-10° with 25 parts of concentrated hydrochloric acid. A warm (40-50°) solution of 14.3 parts of 2-aminonaphthalene and 10 parts of concentrated hydrochloric acid in 200 parts of water is poured into the well cooled diazo suspension and at 10-12° a solution of 40 parts of crystallised sodium acetate in 100 parts of water is slowly added dropwise. To obtain a complete reaction, it is advantageous to add 2-2.5% pyridine as solubility promoter. The o-aminoazo dyestuff is isolated, dissolved in 250 parts of pyridine and it is oxidised to the triazole as described in Example 5. The dry sodium salt of 2 - (2'''.4''' - dimethylstilbyl-4'') - (naphtho - 1'.2':4.5)-1.2.3-triazole-2''-sulphonic acid is obtained as a greenish yellow powder. This compound is a valuable brightening agent for cellulose fibres. As well as having good fastness to washing and light, it is characterised by very good fastness to chlorine. The shade of the white shading obtained therewith on cellulose fibres is more greenish blue than that of the product described in Example 5.

A compound with similar activity and less green-blueish shade is obtained if the 4-amino-2'.4'-dimethylstilbene-2-sulphonic acid is replaced by 31.7 parts of 4-amino-4'-isopropylstilbene - 2 - sulphonic acid. 2-(4'''-isopropyl-stilbyl-4'')-(naphtho - 1'.2':4.5) - 1.2.3 - triazole-2''-sulphonic acid is so obtained. 2-(2'''-isopropyl-stilbyl-4'')-(naphtho-1'.2':4.5)-1.2.3 - triazole - 2'' - sulphonic acid, which is obtained from 4-amino-2'-isopropylstilbene-2-sulphonic acid has a more blueish shade.

*Example 9*

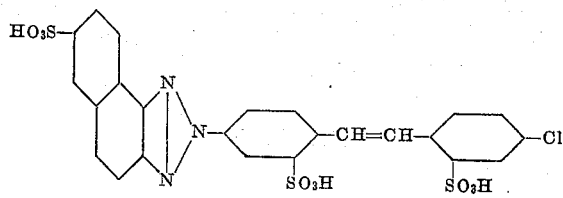

A solution of the disodium salt of 38.95 parts of 4-amino-4'-chlorostilbene-2.2'-disulphonic acid and 6.9 parts of sodium nitrite in 400 parts of water are indirectly diazotised with 25 parts of concentrated hydrochloric acid at 8-10°. The suspension of the diazo compound is coupled at 10-12° with a solution of 22.3 parts of 2-aminonaphthalene-6-sulphonic acid, 4.1 parts of sodium hydroxide and 25 parts of crystallised sodium acetate in 200 parts of water. On completion of the coupling, the o-aminoazo dyestuff is salted out and filtered off. The damp dyestuff dissolved in 400 parts of hot water and 12 parts of sodium hydroxide, is added dropwise within 20 minutes at 70-75° to 110 parts of a sodium hypochlorite solution which contains 17% active chlorine. On completion of the oxidation of the dyestuff which can be seen by the colour of the solution changing from red to orange yellow, it is cooled and the 2-stilbyl-naphthol-triazole compound so obtained is salted out. It is filtered off, washed with saturated salt solution and dried at 50-60°. The sodium salt of 2-(4'''-chlorostilbyl-4'')-(naphtho - 1'.2':4.5) - 1.2.3 - triazole - 2''.2'''.6' - trisulphonic acid is obtained as an easily water soluble yellowish coloured powder and cellulose fibres treated with it attain a pure blueish-white shading. The treatment bath may contain active chlorine without any loss of optical effect.

The 4-amino - 4' - chlorostilbene-2.2'-disulphonic acid necessary for the production of this compound can be easily and cheaply obtained from diazotised 4-nitro-4'-aminostilbene-2.2'-disulphonic acid by reacting this compound with cuprous chloride according to Sandmeyer's process and then reducing the nitro group to the amino group with iron and hydrochloric acid according to the Béchamp method.

A similarly active compound but one containing one less sulphonic acid group is obtained when the diazo suspension described above is added dropwise at 10-12° to a warm solution of 14.3 parts of 2-aminonaphthalene and 11 parts of concentrated hydrochloric acid in 200 parts of water. Thereafter a solution of 40 parts of crystallised sodium acetate in 100 parts of water is slowly added and on completion of the coupling the o-aminoazo dyestuff is isolated. The damp dyestuff is then dissolved in 750 parts of hot water and 12 parts of sodium hydroxide and oxidised with sodium hypochlorite solution to form 2-stilbyl-naphthotriazole. The sodium salt of 2-(4″-chlorostilbyl - 4″) - (naphtho - 1′.2′:4.5) - 1.2.3 - triazole-2‴.2‴-disulphonic acid is obtained as a pale yellowish substance. It is a valuable brightening agent for cellulose fibres, soap powders and auxiliary washing agents.

If 43.39 parts of 4-amino-4′-bromostilbene-2.2′-disulphonic acid are used instead of the 4-amino-4′-chlorostilbene-2.2′-disulphonic acid, 2-(4‴-bromostilbyl-4″)-(naphtho-1′.2′:4.5) - 1.2.3-triazole-2″.2‴.6′-trisulphonic acid is obtained by coupling with 2-aminonaphthalene-6-sulphonic acid followed by oxidation. If 2-aminonaphthalene is used for the coupling, the dyestuff obtained can be oxidised to produce 2-(4‴-bromostilbyl-4″)-(naphtho-11.2′:4.5)-1.2.3-triazole-2″.2‴-disulphonic acid. Both compounds, which in the form of sodium salts are yellowish powders, are active brightening agents. When compared with the chlorine derivatives above described, the nuance produced by both these compounds is somewhat more reddish.

4-amino-4′-bromostilbene-2.2′-disulphonic acid can be easily obtained in a manner analogous to the corresponding chlorine compound by reacting diazotised 4-nitro-4′-amino-stilbene12.2′-disulphonic acid with cuprous bromide according to Sandmeyer and then reducing the nitro group to the amino group.

*Example 10*

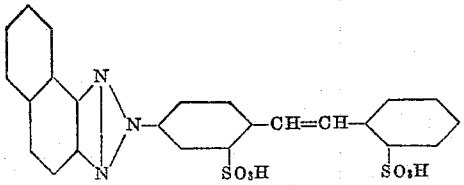

35.5 parts of 4-aminostilbene-2.2′-disulphonic acid are indirectly diazotised as described in Example 1 and at 10–12° a warm solution of 14.3 parts of 2-aminonaphthalene and 11 parts of concentrated hydrochloric acid in 200 parts of water is added dropwise. A solution of 40 parts of crystillised sodium acetate in 100 parts of water is then slowly added. On completion of the coupling, the o-aminoazo dyestuff is isolated, dissolved in 750 parts of hot water and 12 parts of sodium hydroxide and, as described in Example 1, oxidised with sodium hypochlorite solution to form the 2-stilbylnaphthotriazole compound which is isolated and dried. The sodium salt of 2 - (stilbyl - 4″) - (naphtho - 1′.2′:4.5) - 1.2.3 - triazole-2″.2‴-disulphonic acid is obtained as a pale yellow coloured powder which dissolves well in water. Cellulose fibres treated with this compound attain a beautiful white shading and the treatment bath may also contain active chlorine without any loss of optical effect.

If the diazo compound is coupled with a solution of 22.3 parts of 2-aminonaphthalene-6-sulphonic acid instead of with 2-aminonaphthalene, after oxidation of the o-aminoazo dyestuff the sodium salt of 2-(stilbyl-4″)-(naphtho-1′.2′:4.5) - 1.2.3 - triazole - 2″.2‴.6′ - trisulphonic acid is obtained. The substance is a yellowish powder and on cellulose fibres has properties similar to those of the product described above although it is slightly less fast to washing.

The 4-aminostilbene-2.2′-disulphonic acid necessary for the production of this compound can be easily produced from diazotised 4-nitro-4′-aminostilbene-2.2′-disulphonic acid by replacing the diazo group by hydrogen and then reducing the nitro group to the amino group with iron and hydrochloric acid according to Béchamp.

*Example 11*

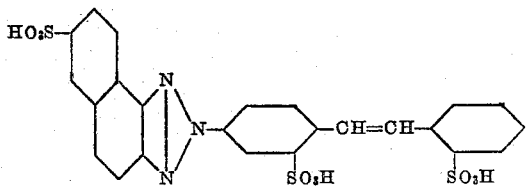

60.2 parts of 2 - (4‴ - aminostilbyl - 4″) - (naphtho-1′.2′:4.5) - 1.2.3 - triazole - 6′.2″.2‴ - trisulphonic acid are dissolved as sodium salt in 600 parts of water, an aqueous solution of 6.9 parts of sodium nitrite is added and the whole is indirectly diazotised at 10–15° with 25 parts of concentrated hydrochloric acid. After stirring for 1 hour, the diazo compound precipitates completely on the addition of common salt. It is filtered off. The damp diazo compound is then added in portions to 1000 parts of boiling alcohol and boiled under reflux for several hours until the diazo reaction disappears. The mixture is then cooled, filtered, the residue is dissolved with caustic soda lye in hot water with a phenolphthalein alkaline reaction and purified by the addition of sodium hydrosulphite and animal charcoal. After filtering, the sodium salt of 2 - (stilbyl - 4″) - (naphtho - 1′.2′:4.5)-1.2.3 - triazole - 6′.2″.2‴ - trisulphonic acid is precipitated with common salt. It is a yellowish coloured substance. Cellulose fibres treated with it are given a beautiful white shading.

*Example 12*

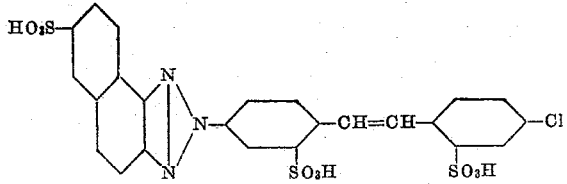

60.2 parts of 2 - (4‴ - aminostilbyl - 4″) - (naphtho-1′.2′:4.5) - 1.2.3 - triazole - 6′.2″.2‴ - trisulphonic acid are diazotised as described in Example 11. The diazo compound in suspension form is slowly poured at 70–90° into a cuprous chloride solution prepared from 20 parts of crystalline copper sulphate. On completion of the reaction which can be seen by the disappearance of the diazo reaction, the reaction product is precipitated with common salt, filtered off and the compound obtained is purified by recrystallisation in the presence of sodium hydrosulphite and animal charcoal. The sodium salt of 2 - (4‴ - chlorostilbyl - 4″) - (naphtho - 1′.2′:4.5) - 1.2.3-triazole-6′.2″.2‴-trisulphonic acid is obtained as a yellowish coloured powder which gives cellulose fibres treated therewith a pure blueish white shading.

*Example 13*

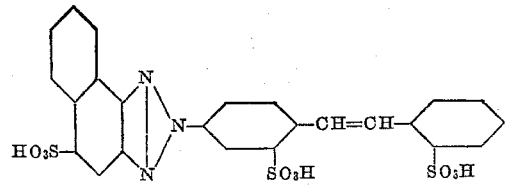

A solution of the trisodium salt of 60.2 parts of 2-(4‴-aminostilbyl-4″) - (napthto-1′.2′:4.5)-1.2.3-triazole-2″.2‴.4′-trisulphonic acid and 6.9 parts of sodium nitrite in 500 parts of water is indirectly diazotised at 10–15° with 25 parts of concentrated hydrochloric acid. The whole is stirred for about 1 hour and then the diazo compound is precipitated with common salt. The diazo compound, after being well filtered under suction, is added in portions to 1000 parts of boiling alcohol and heated under reflux for several hours until the diazo reaction disappears. The mixture is cooled to room temperature, filtered and the residue is dissolved with caustic soda lye in hot water with a phenolphthalein alkaline reaction. The solution obtained is purified, e. g. by the addition of sodium hydrosulphite and animal charcoal, filtered hot and the sodium salt of 2-(stilbyl-4")-(naphtho-1'.2':4.5)-1.2.3-triazole-4'.2".2'''-trisulphonic acid is precipitated with common salt. The product is a pale yellowish powder and is a valuable brightening agent for cellulose fibres, wool, soap powders and washing agents.

*Example 14*

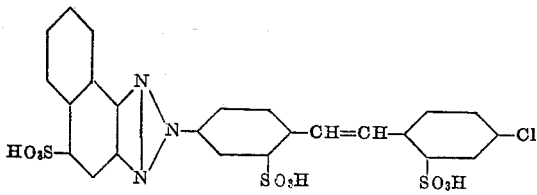

60.2 parts of 2-(4'''-aminostilbyl-4")-(naphtho-1'.2':4.5)-1.2.3-triazole-2".2'''.4'-trisulphonic acid are indirectly diazotised as described in Example 13. The diazo compound in suspension form is slowly poured at 70–90° into a cuprous chloride solution prepared from 20 parts of crystalline copper sulphate. On completion of the reaction, the whole is cooled, the reaction product is precipitated with common salt and purified by crystallisation in the presence of sodium hydrosulphite and animal charcoal. The sodium salt of 2-(4'''-chlorostilbyl-4")-(naphtho-1'.2':4.5)-1.2.3-triazole-4'.2".2'''-trisulphonic acid is a yellowish coloured powder and is also a valuable brightening agent for cellulose fibres and washing agents.

*Example 15*

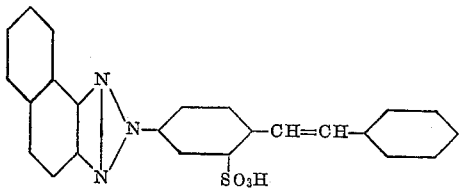

A solution of 27.5 parts of 4-aminostilbene-2-sulphonic acid, 24 parts of the sodium salt of naphthalene-2-sulphonic acid, 4.1 parts of sodium hydroxide and 6.9 parts of sodium nitrite in 400 parts of water is indirectly diazotised at 18–20° with 25 parts of concentrated hydrochloric acid. The suspension of the diazo compound is coupled at 40–42° with a solution of 22.3 parts of 2-aminonaphthalene-1-sulphonic acid and 4.1 parts of sodium hydroxide in 200 parts of water. The mineral acid reaction of the suspension is neutralised by the gradual addition of 25 parts of crystallised sodium acetate. On completion of the coupling, 80 parts of sodium chloride are added, the precipitated o-aminoazo dyestuff is filtered off and washed. The damp product is then dissolved in 200 parts of pyridine while warming and a 30% aqueous solution of 12 parts of sodium hydroxide is added. 90 to 120 parts of about 17% sodium hypochlorite solution is added dropwise within 30 minutes at a temperature of 30–35°. The temperature is slowly raised to 80–85° to complete the oxidation of the dyestuff. On completion of the oxidation a further 5 parts of sodium hydroxide dissolved in 15 parts of water are added and the pyridine is removed with steam. In order to obtain a very light reaction product, a reducing agent, e. g. 2 to 5 parts of sodium hydrosulphite, can be added at the beginning of the steam distillation. On completion of the steam distillation, the compound, which has precipitated in the form of yellowish crystal needles, is filtered off and washed with water. In this way, the sodium salt of 2-(stilbyl-4")-(naphtho-1'.2':4.5)-1.2.3-triazole-2"-sulphonic acid is obtained. This compound is a valuable brightening agent for soaps and synthetic washing agents as well as for cellulose fibres.

*Example 16*

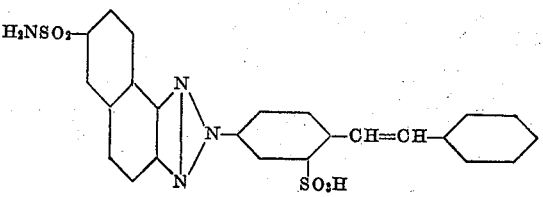

27.5 parts of 4-aminostilbene-2-sulphonic acid and 4.0 parts of sodium hydroxide are dissolved in 200 parts of water, 6.9 parts of sodium nitrite are added and the whole is diazotised at 10–12° with 25 parts of concentrated hydrochloric acid. The suspension of this diazo compound is then coupled with an aqueous solution of 22.2 parts of 2-amino-naphthalene-6-sulphonic acid amide and 10 parts of concentrated hydrochloric acid. The reaction of the mixture is kept in the weakly mineral acid range by the addition of a sufficient amount of an aqueous solution of about 40 parts of crystallised sodium acetate. On completion of the coupling, the dyestuff is filtered off and washed with water. The damp o-aminoazo dyestuff is then dissolved warm in 400 parts of technical pyridine, a mixture of 60 parts of crystallised copper sulphate in 240 parts of water and 120 parts of concentrated ammonia is added and the whole is stirred at 90–95° until the oxidation of the dyestuff is complete. After cooling, on the addition of sodium chloride, the layer containing the copper salts is separated from the pyridine, the pyridine layer is washed several times with sodium chloride solution containing ammonia and finally on the addition of 10 parts of sodium hydroxide and 2–5 parts of sodium hydrosulphite, the pyridine is distilled off. To purify further, the precipitated product is filtered off, dissolved in hot aqueous dimethyl formamide and filtered hot with the addition of a little animal charcoal. The solution obtained in this way is poured into 4–5 times its volume of about a 10% sodium chloride solution, the precipitated product is filtered off, washed with water and dried in the vacuum. The sodium salt of 2-(stilbyl-4")-(naphtho-1'.2':4.5)-1.2.3-triazole-6'-sulphonic acid amide-2"-sulphonic acid is obtained as pale yellowish powder which is difficultly soluble in water. The product is a valuable brightening agent for linear polyamide fibres such as nylon, Perlon, etc. The pure white brightening effects obtained therewith are distinguished by an excellent fastness to chlorine and a very good fastness to light.

A product with a similar effect is obtained if in the above example the 2-aminonaphthalene-6-sulfonic acid amide is replaced by 28 parts of 2-aminonaphthalene-6-sulphonic acid-N-methyl-N-hydroxyethyl amide and the o-aminoazo dyestuff is oxidised to form the triazole compound. The sodium salt of 2-(stilbyl-4")-(naphtho-1'.2':4.5)-1.2.3-triazole-6'-sulphonic acid - N - methyl - N-hydroxyethyl amide-2"-sulphonic acid is obtained as a yellowish powder which is also difficultly soluble in water.

A compound which is more easily soluble in water and has also equally good properties is obtained if the diazo suspension of 4-aminostilbene-2-sulphonic acid described above is reacted with an aqueous solution of 39.65 parts of 2-aminonaphthalene-6-(p-chlorophenyl)-disulphimide, 4.0 parts of sodium hydroxide and 25 parts of crystallised sodium acetate. 2-(stilbyl-4")-(naphtho-1'.2':4.5)-1.2.3-triazole-6'-(p-chlorophenyl disulphimide)-2"-sulphonic acid is obtained by oxidation of the o-aminoazo dyestuff obtained. In the form of its sodium salt, this product is a yellowish powder. Its diluted aqueous solutions lend to linear polyamide fibres such as nylon treated therewith a beautiful white shading. The brightening effects attained therewith are distinguished by an excellent fastness to chlorine and very good fastness to light.

Example 17

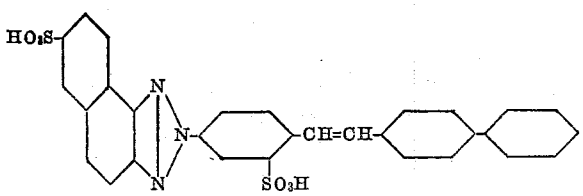

35.1 parts of 4-amino-4'-phenyl-stilbene-2-sulphonic acid and 4.0 parts of sodium hydroxide are dissolved in 1000 parts of water, 6.9 parts of sodium nitrite are added and the whole is indirectly diazotised at 10–12° with 25 parts of concentrated hydrochloric acid. The diazo suspension so obtained is coupled at 12–15° with a neutral solution of 22.3 parts of 2-aminonaphthalene-6-sulphonic acid and 25 parts of crystalline sodium acetate in 200 parts of water. On completition of the coupling the dyestuff is filtered off, washed and then dissolved in 500 parts of pyridine. To oxidise the triazole compound, a mixture of 60 parts of crystallised copper sulphate in 240 parts of water and 120 parts of concentrated ammonia is added and the whole is stirred at 90–95° until the dyestuff has completely disappeared. The separation of the copper salts and the purification of the raw product are performed as described in Example 16. The sodium salt of 2-(4'''-phenyl-stilbyl-4'')-(naphtho-1'.2':4.5)-1.2.3-triazole-6'.2''-disulphonic acid is obtained as a yellowish powder which is fairly difficult to dissolve in water.

If the 2-aminonaphthalene-6-sulphonic acid is replaced by 14.3 parts of 2-aminonaphthalene, then after oxidation, the sodium salt of 2-(4'''-phenyl-stilbyl-4'')-(naphtho-1'.2':4.5)-1.2.3-triazole-2''-sulphonic acid is obtained as a yellowish powder which is difficultly soluble in water. The two compounds named are valuable brightening agents for linear polyamide fibres such as nylon or Perlon etc. They are able to give fibres treated therewith a blue-white brightening effect in daylight. The brightening effects so obtained are distinguished by an excellent fastness to chlorine and good fastness to light.

Example 18

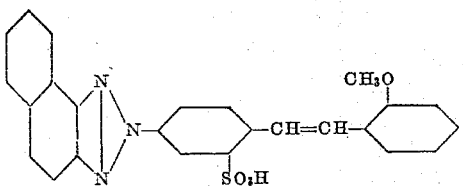

30.5 parts of 4-amino-2'-methoxy-stilbene-2-sulphonic acid and 4.0 parts of sodium hydroxide are dissolved in 300 parts of water, 6.9 parts of sodium nitrite are added and the whole indirectly diazotised at 10–12° with 25 parts of concentrated hydrochloric acid. The diazo suspension obtained is coupled at 12–15° with a solution of 14.3 parts of 2-aminonaphthalene and 10 parts of concentrated hydrochloric acid in 250 parts of water and the strong mineral acid reaction of the mixture is kept in the weakly mineral acid range by the addition of a sufficient amount of an aqueous solution of about 40 parts of crystallised sodium acetate. On completition of the coupling the dyestuff is filtered off, washed and then dissolved in 600 parts of warm pyridine with the addition of 10 parts of sodium hydroxide. 150 parts of about a 17% solution of sodium hypochlorite solution is added dropwise within half an hour at 30–35°. The temperature is slowly brought to 70–80° and the whole is stirred until the dyestuff has completely disappeared. Then the pyridine is distilled off with steam whilst the oxidation product which can be bleached at the beginning of the steam distillation is decomposed by the addition of 3–8 parts of sodium hydrosulphite. The precipitated triazole compound is filtered off, washed with water and then dissolved, for further purification, in hot aqueous ethyleneglycol monomethyl ether and filtered hot with the addition of a little animal charcoal. The solution so obtained is poured into 4–5 times its volume of about 10% sodium chloride solution, the precipitated product is filtered off, washed with water and dried in the vacuum. The sodium salt of 2-(2'''-methoxy-stilbyl-4'')-(naphtho-1'.2':4.5)-1.2.3-triazole-2''-sulphonic acid is obtained as a yellowish powder which is difficultly soluble in water. The product is an excellent agent for the brightening of linear polyamide fibres. The blue-white brightening effects obtained therewith are distinguished by an excellent fastness to chlorine and good fastness to light.

A product with similar properties is obtained if in the above example the 4-amino-2'-methoxy-stilbene-2-sulphonic acid is replaced by 30.5 parts of 4-amino-3'-methoxy-stilbene-2-sulphonic acid. By reacting this diazo compound with 2-aminonaphthalene and oxidation of the o-aminoazo dyestuff to form the triazole compound, the sodium salt of 2-(3'''-methoxy-stilbyl-4'')-(naphtho-1'.2':4.5)-1.2.3-triazole-2''-sulphonic acid is obtained also as a yellowish powder which is difficultly soluble in water.

If the first named 4-amino-2'-methoxy-stilbene-2-sulphonic acid is replaced by 30.5 parts of 4-amino-4'-methoxy-stilbene-2-sulphonic acid, coupled with 2-aminonaphthalene and the o-aminoazo dyestuff is oxidised to form the triazole compound, then the sodium salt of 2-(4'''-methoxy-stilbyl-4'')-(naphtho-1'.2':4.5)-1.2.3-triazole-2''-sulphonic acid is obtained as a yellow powder. It is difficultly soluble in water and easily soluble in dimethyl formamide or ethylene glycol monomethyl ether. The product has an excellent brightening effect on linear polyamide fibres such as nylon etc. The brightening effects obtained therewith have a more greenish shade than that of the white shadings attained with the first named product. The brightening effects obtained have excellent fastness to chlorine and good fastness to light.

A compound with practically similar properties, the nuance of which however is somewhat shifted more towards the green, is obtained if the 4-amino-2'-methoxy-stilbene-2-sulphonic acid is replaced by 31.9 parts of 4-amino-4'-ethoxy-stilbene-2-sulphonic acid. The sodium salt of 2-(4'''-ethoxy-stilbyl-4'')-(naphtho-1'.2' 4.5)-1.2.3-triazole-2''-sulphonic acid is also a yellow powder which is difficultly soluble in water.

If the 4-amino-2'-methoxy-stilbene-2-sulphonic acid is replaced by 31.9 parts of 4-amino-3'.4'-dihydroxymethylene-stilbene-2-sulphonic acid, then the sodium salt of 2-(3'''.4'''-dihydroxymethylene-stilbyl-4'')-(naphtho-1'.2':4.5)-1.2.3-triazole-2''-sulphonic acid is obtained as a yellow powder which is difficultly soluble in water. Dyed on to linear polyamide fibres such as nylon, the product has a similar nuance to that described immediately above. The brightening effects obtained are distinguished by excellent fastness to chlorine and good fastness to light.

A product which produces on linear polyamide fibres such as nylon, brightening effects which appear pure blue, is obtained if in the above example the 4-amino-2'-methoxy-stilbene-2-sulphonic acid is replaced by 36.7 parts of 4-amino-4'-phenoxy-stilbene-2-sulphonic acid. The sodium salt of 2-(4'''-phenoxy-stilbyl-4'')-(naphtho-1'.2':4.5)-1.2.3-triazole-2''-sulphonic acid is obtained as a yellow powder. It dissolves with difficulty in water and easily in dimethyl formamide and ethylene glycol monomethyl ether. The brightening effects attained therewith are distinguished by excellent fastness to chlorine and good fastness to light.

A product which is more easily soluble in water and also has interesting properties is obtained if the diazo compound of 4-amino-4'-phenoxy-stilbene-2-sulphonic acid is coupled with an aqueous solution of 22.3 parts of 2-aminonaphthalene-6-sulphonic acid, 4.0 parts of sodium hydroxide and 25 parts of crystallised sodium acetate to form the o-aminoazo dyestuff and then oxidised as described above to form the triazole compound. The di-sodium salt of 2-(4'''-phenoxy-stilbyl-4'')-(naphtho-1'.2':4.5)-1.2.3-triazole-2''.6'-disulphonic acid is a yellowish powder.

*Example 19*

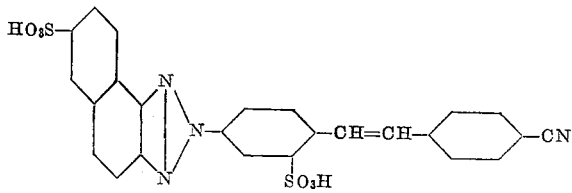

30 parts of 4-amino-4'-cyano-stilbene-2-sulphonic acid and 4.0 parts of sodium hydroxide are dissolved in water, 6.9 parts of sodium nitrite are added and the whole is indirectly diazotised at 10–12° with 25 parts of concentrated hydrochloric acid. The diazo suspension obtained is coupled with an aqueous solution of 22.3 parts of 2-amino-naphthalene-6-sulphonic acid, 4.0 parts of sodium hydroxide and 25 parts of crystallised sodium acetate, the coupling being performed at 12–15°. On completion of the coupling the dyestuff is precipitated with sodium chloride, washed and then dissolved in warm pyridine. A mixture of 60 parts of crystallised copper sulphate in 240 parts of water and 120 parts of concentrated ammonia are added to oxidise to form the triazole compound and the whole is stirred at 90–95° until the dyestuff has disappeared. The copper salts are separated and the product is purified as described in Example 16. The di-sodium salt of 2-(4'''-cyano-stilbyl-4'')-naphtho-1'.2':4.5)-1.2.3-triazole-2''.6'-disulphonic acid is obtained as a yellowish powder which dissolves well in water. The product, due to its substantivity, lends a pure bluish-white shading to cellulose fibres treated with diluted aqueous solutions thereof. The bluish-white shading has good fastness properties, in particular excellent fastness to chlorine and good fastness to light.

If in the above example the 4-amino-4'-cyano-stilbene-2-sulphonic acid is replaced by 30 parts of 4-amino-3'-cyano-stilbene-2-sulphonic acid, then 2-(3'''-cyano-stilbyl-4'')-(naphtho-1'.2':4.5)-1.2.3-triazole-2''.6'-disulphonic acid is obtained by coupling the diazo compound with 2-aminonaphthalene-6-sulphonic acid and oxidation of the o-aminoazo dyestuff obtained. The di-sodium salt of this compound is also a yellowish powder which dissolves well in water. Dyed on to cellulose fibres, the product has similar, somewhat more reddish optical effects than the compound described above. The brightening effects obtained therewith also have excellent fastness to chlorine and good fastness to light.

A product which is difficultly soluble in water is obtained if the diazo compound of 4-amino-3'-cyano-stilbene-2-sulphonic acid is coupled with an aqueous solution of 14.3 parts of 2-aminonaphthalene and 10 parts of concentrated hydrochloric acid and the reaction of the mixture is kept in the weakly mineral acid range by the addition of a sufficient amount of about 40 parts of crystallised sodium acetate. By oxidising the o-aminoazo dyestuff with copper tetrammine sulphate in pyridine, the triazole compound is obtained. The sodium salt of 2-(3'''-cyano-stilbyl-4'')-(naphtho-1'.2':4.5)-1.2.3-triazole-2''-sulphonic is a yellowish powder which is easily dissolved in dimethyl formamide or ethylene glycol monomethyl ether.

*Example 20*

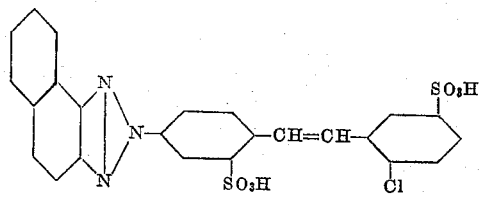

6.9 parts of sodium nitrite are added to a neutral aqueous solution of 30.95 parts of 4-amino-2'-chloro-stilbene-2.5'-disulphonic acid and the whole is indirectly diazotised at 10–12° with 25 parts of concentrated hydrochloric acid. The diazo compound obtained is coupled at 12–15° with a solution of 14.3 parts of 2-aminonaphthalene and 10 parts of concentrated hydrochloric acid in 250 parts of water and the reaction of the mixture is kept in the weakly mineral acid range by the addition of a sufficient amount of about 40 parts of crystallised sodium acetate. On completion of the coupling, the dyestuff is salted out and filtered off. The o-aminoazo dyestuff is then dissolved in hot water with the addition of 20 parts of concentrated ammonia, a mixture of 60 parts of crystallised copper sulphate in 240 parts of water and 120 parts of concentrated ammonia is added and the whole is stirred at 90–95° to complete the oxidation of the dyestuff. The triazole compound is then completely salted out with sodium chloride, filtered off and washed with ammoniacal sodium chloride solution. The raw product is then dissolved in hot water with the addition of 10 parts of sodium hydroxide, a slight excess of sodium sulphide is added to remove the last traces of soluble copper salts, 4–8 parts of sodium hydrosulphite are added at 90–95° to decompose the oxidation products which can be reduced and, with the addition of some animal charcoal, the solution is filtered hot. The triazole compound is salted out from the weakly yellowish solution obtained and, after cooling the precipitated product, filtered off, washed with sodium chloride solution and dried in the vacuum. The di-sodium salt of 2-(2'''-chloro-stilbyl-4'')-(naphtho-1'.2':4.5)-1.2.3-triazole-2''.5'''-disulphonic acid is obtained as a yellowish powder which dissolves well in water. In small concentrations from diluted aqueous solutions, the product lends to cellulose fibres treated therewith a pure bluish white shading. The treatment bath can contain active chlorine without any loss of optical effect.

If in the above example, the 2-aminonaphthalene is replaced by an aqueous solution of 22.3 parts of 2-aminonaphthalene-6-sulphonic acid, 4.0 parts of sodium hydroxide and 25 parts of crystallised sodium acetate, after oxidation of the o-aminoazo dyestuff, the trisodium salt of 2-(2'''-chloro-stilbyl-4'')-(naphtho-1'.2':4.5)-1.2.3-triazole-2''.5'''.6'-trisulphonic acid is obtained as a yellowish powder which dissolves very well in water. With slightly less fastness to washing, the product has similar properties to those of the compound described above.

Also 4-amino-2'-chlorostilbene-2.5'-disulphonic acid can be replaced by 35.5 parts of 4-aminostilbene-2.4'-disulphonic acid. By coupling the diazo compound obtained with 2-aminonaphthalene and oxidation of the o-aminoazo dyestuff the disodium salt of 2-(stilbyl-4'')-(naphtho-1'.2':4.5)-1.2.3-triazole-2''.4'''-disulphonic acid is obtained as a pale yellowish powder which dissolves well in water. Cellulose fibres treated with diluted aqueous solutions of this product show an excellent brightening effect which has good fastness properties. The shade obtained therewith is shifted more towards the red part of the spectrum in comparison with that of the product described above.

Again, 4-amino-2'-chloro-stilbene-2.5'-disulphonic acid can be replaced by 35.3 parts of 4-amino-4'-methylsulphone-stilbene-2-sulphonic acid. By reacting the diazo suspension with 2-aminonaphthalene and converting the o-aminoazo dyestuff by oxidation into the triazole compound, the sodium salt of 2-(4'''-methyl sulphone-stilbyl-4'')-(naphtho-1'.2':4.5)-1.2.3-triazole-2''-sulphonic acid is obtained as a yellowish powder which is rather difficultly soluble in water. The product is a valuable brightening agent for linear polyamide fibres such as nylon, Perlon, etc. The brightening effects obtained therewith are distinguished by excellent fastness to chlorine and good fastness to light.

A product which is more easily soluble in water and is also suitable for the brightening of linear polyamide fibres is obtained if the diazo compound of 4-amino-4'-methyl sulphone-stilbene-2-sulphonic acid is coupled with 2-aminonaphthalene-6-sulphonic acid and the o-aminoazo dyestuff obtained is oxidised to form the triazole compound. The di-sodium salt of 2-(4'''-methylsulphone-stilbyl - 4'') - (naphtho - 1'.2':4.5) - 1.2.3-triazole-2''.6'-disulphonic acid is obtained as a yellowish powder.

*Example 21*

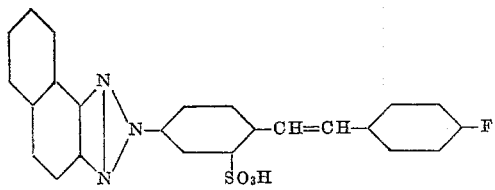

29.3 parts of 4-amino-4'-fluoro-stilbene-2-sulphonic acid and 4.0 parts of sodium hydroxide are dissolved in 400 parts of water, 6.9 parts of sodium nitrite are added and the whole is indirectly diazotised at 10–12° with 25 parts of concentrated hydrochloric acid. The diazo suspension obtained is coupled at 12–15° with an aqueous solution of 14.3 parts of 2-aminonaphthalene and 10 parts of concentrated hydrochloric acid and the strongly mineral acid reaction of the mixture is kept in the weakly mineral acid range by the addition of a sufficient amount of about 40 parts of crystallised sodium acetate. On completion of the coupling, the dyestuff is filtered off, washed, dissolved in 500 parts of warm pyridine and, to complete the oxidation of the dyestuff, is stirred at 90–95° with a mixture of 60 parts of crystallised copper sulphate and 120 parts of concentrated ammonia. The separation of the copper salts and pyridine as well as the purification of the raw product are performed as described in Example 16. The sodium salt of 2 - (4''' - fluoro - stilbyl - 4'')-(naphtho-1'.2':4.5)-1.2.3-triazole-2''-sulphonic acid is obtained as a yellowish white powder which is difficultly soluble in water and easily soluble in dimethyl formamide. Due to its substantivity from diluted aqueous solutions, this compound can draw on to cellulose fibres and lends them a more white appearance in daylight. The brightening effects obtained therewith are distinguished by excellent fastness to chlorine and good fastness to light.

The diazo compound obtained according to the above example can also be reacted with an aqueous solution of 22.3 parts of 2-aminonaphthalene-6-sulphonic acid, 4.0 parts of sodium hydroxide and 25 parts of crystallised sodium acetate. By oxidation of the o-aminoazo dyestuff in aqueous solution with a mixture of 60 parts of crystallised copper sulphate in 240 parts of water and 120 parts of concentrated ammonia as described in Example 20, after working up and purifying, the disodium salt of 2 - (4''' - fluoro - stilbyl - 4'')-(naphtho-1'.2':4.5) - 1.2.3-triazole-2''.6'-disulphonic acid is obtained as a yellowish powder which dissolves well in water. The product is also an active brightening agent for cellulose fibres. The brightening effects obtained therewith have excellent fastness to active chlorine.

*Example 22*

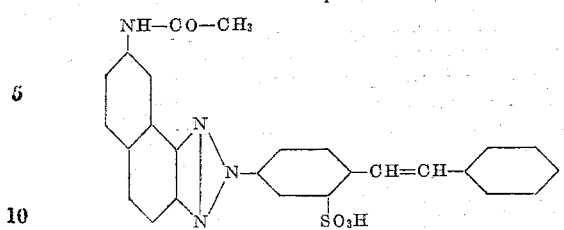

27.5 parts of 4-aminostilbene-2-sulphonic acid are indirectly diazotised as described in Example 1, and the diazo suspension obtained is coupled at 12–15° with an aqueous solution of 15.8 parts of 2.7-diaminonaphthalene and 20 parts of concentrated hydrochloric acid. The strongly mineral acid reaction of the mixture is kept first in the weakly mineral acid and then in the acetic acid range by the gradual addition of about 55 parts of crystallised sodium acetate. On completion of the coupling, the dyestuff is filtered off and washed with water. The damp o-aminoazo dyestuff is then dissolved at a temperature of 90–95° in 500 parts of technical pyridine, a solution of 60 parts of crystallised copper sulphate in 240 parts of water is added and the whole is stirred in a boiling water bath until the dyestuff is completely oxidised. After cooling, on the addition of 120 parts of concentrated ammonia and sodium chloride, the aqueous copper containing layer is separated from the pyridine, the pyridine layer is washed several times with ammoniacal sodium chloride solution and, after the addition of 10 parts of sodium hydroxide and 3–8 parts of sodium hydrosulphite, the pyridine is distilled off with steam. To purify further, the raw product is dissolved in hot aqueous ethylene glycol monomethyl ether and filtered hot with the addition of animal charcoal. The filtrate is poured in to 4–5 times its volume of about a 10% sodium chloride solution, the precipitated product is filtered off, washed with water and dried in the vacuum. The sodium salt of 2-(stilbyl-4'')-(7'-amino-naphtho-1'.2':4.5)-1.2.3-triazole 12''-sulphonic acid is obtained as a greenish-yellow powder which is difficultly soluble in water.

Finally 23.6 parts of this sodium salt are dissolved in 300 parts of warm pyridine, 25 parts of acetic acid anhydride are added dropwise within 15 minutes at 40–42° and then the whole is stirred for 1 hour at 40–42°. The acetylation mixture is then poured into an aqueous solution of 60 parts of calcinated sodium carbonate, the two layers are separated by the addition of an equal number of parts by volume of a saturated sodium chloride solution, the pyridine layer is separated and the pyridine is distilled off with steam. The residue is filtered off, washed, dissolved in hot dimethyl formamide and filtered hot with the addition of animal charcoal. The filtrate is then poured into 4–5 times its volume of about 10% sodium chloride solution, the precipitated product is filtered off, washed and dried in the vacuum. The sodium salt of 2-(stilbyl-4'')-(7'-acetamino-naphth-1'.2':4.5)-1.2.3-triazole-2''-sulphonic acid is obtained as a greenish-yellow powder. From its diluted aqueous solutions with a neutral or weakly alkaline reaction, this compound lends to cellulose fibres as well as to linear polyamide fibres such as, e. g. nylon or Perlon, a more white appearance. The brightening effects attained thereof are distinguished by very good fastness properties.

If in the above example, the acetic acid anhydride is replaced by 25 parts of benzoyl chloride, then the sodium salt of 2 - (stilbyl - 4'') - (7' - benzoylamino - naphtho-1'.2':4.5)-1.2.3-triazole-2''-sulphonic acid is obtained. This compound is suitable for the brightening of linear polyamide fibres such as nylon etc. and has a beautiful bluish-white shade.

Compounds with similar properties are obtained if in the above example the 2.7-diaminonaphthalene is replaced by 15.8 parts of 2.6-diaminonaphthalene. By reacting the 2-(stilbyl-4")-(6'-amino-naphtho-1'.2':4.5)-1.2.3-triazole-2"'-sulphonic acid obtained with acetic acid anhydride or benzoyl chloride as described above, the sodium salt of 2-(stilbyl-4")-(6'-acetamino- or 6'-benzoylamino - naphtho - 1'.2':4.5) - 1.2.3 - triazole - 2"'-sulphonic acid are obtained. Both compounds are yellow powders which are difficultly soluble in water.

*Example 23*

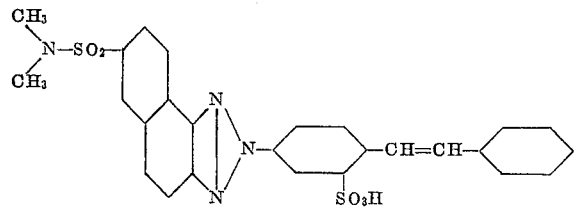

A diazo suspension from 27.5 parts of 4-aminostilbene-2-sulphonic acid prepared according to Example 1 is coupled at 12–15° with a solution of 25.0 parts of 2-aminonaphthalene-6-sulphonic acid dimethylamide and 10 parts of concentrated hydrochloric acid in 50% aqueous dimethyl formamide. The strongly mineral acid reaction of the mixture is neutralised by the gradual addition of about 40 parts of crystallised sodium acetate. On completion of the coupling, the o-aminoazo dyestuff is filtered off, washed with water and then dissolved in warm pyridine. On the addition of a mixture of 60 parts of crystallised copper sulphate in 240 parts of water and 120 parts of concentrated ammonia, the whole is stirred in a boiling water bath until the dyestuff is completely oxidised. After cooling and the addition of sodium chloride, the aqueous copper containing layer is separated from the pyridine, and the pyridine is washed several times with ammoniacal sodium chloride. The pyridine is then, with the addition of an aqueous solution of 10 parts of sodium hydroxide and 3–8 parts of sodium hydrosulphite, distilled off with steam. The precipitated triazole compound is filtered off from the mother lye, washed with water, dissolved in hot aqueous dimethyl formamide and, with the addition of animal charcoal, filtered hot. The filtrate is poured into 4–5 times its volume of about a 10% sodium chloride solution, the product which precipitates is filtered off, washed with water and dried in the vacuum. The sodium salt of 2-(stilbyl-4")-(naphtho-1'.2':4.5)-1.2.3-triazole-6'-sulphonic acid dimethylamide-2"-sulphonic acid is obtained as a yellow powder which dissolves with difficulty in water. The product can be used both from the brightening of cellulose fibres and also of linear polyamide fibres such as, e. g. nylon, from a neutral to weakly alkaline bath. The brightening effects obtained on cotton have a greenish blue and on nylon a pure bluish shade. They are distinguished by good fastness to light and excellent fastness to chlorine.

Compounds suitable for the brightening of linear polyamide fibres are obtained if in the above example, 2-aminonaphthalene-6-sulphonic acid dimethylamide is replaced either by 29.8 parts of 2-aminonaphthalene-6-sulphonic acid anilide or by 30.4 parts of 2-aminonaphthalene-6-sulphonic acid cyclohexylamide. After oxidation of the o-aminoazo dyestuff and purification of the raw product, the sodium salt of 2-(stilbyl-4")-(naphtho-1'.2':4.5)-1.2.3-triazole-6'-sulphonic acid anilide-2"-sulphonic acid or of -6'-sulphonic acid cyclohexylamide-2"-sulphonic acid are obtained as yellow powders which are also difficultly soluble in water.

Further, in the above example the 2-aminonaphthalene-6-sulphonic acid dimethyl amide can be replaced by 25.0 parts of 2-aminonaphthalene-5-sulphonic acid dimethyl amide or by 25.0 parts of 2-aminonaphthalene-7-sulphonic acid dimethyl amide. By oxidation of the o-aminoazo dyestuff, the sodium salts of 2-(stilbyl-4")-(naphtho-1'.2':4.5)-1.2.3-triazole-5'- or -7'- sulphonic acid dimethylamide-2"-sulphonic acids are obtained as yellow powders. Both compounds which are difficultly soluble in water, are excellent agents for the brightening of cellulose fibres and linear polyamide fibres.

*Example 24*

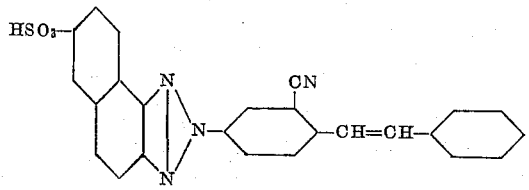

22.0 parts of 4-amino-2-cyano-stilbene and 25 parts of concentrated hydrochloric acid are dissolved in 300 parts of 80% acetic acid, 150 parts of ice are added and diazotised at 5–8° with an aqueous solution of 6.9 parts of sodium nitrite. The diazo compound obtained is then coupled with an aqueous solution of the sodium salt of 22.3 parts of 2-aminonaphthalene-6-sulphonic acid and 25 parts of crystallised sodium acetate. On completion of the coupling, the dyestuff is salted out and filtered off. The damp o-aminoazo dyestuff is dissolved in 500 parts of pyridine warm with the addition of an aqueous solution of 6 parts of sodium hydroxide and then 105 parts of about a 17% sodium hypochlorite solution is added dropwise within 30 minutes at 30–35°. The temperature is slowly raised to 70–80° and the whole is stirred until the dyestuff has disappeared. The pyridine is then distilled off with steam whilst the oxidation products which can be reduced at the beginning of the steam distillation are decomposed by the addition of 3–8 parts of sodium hydrosulphite. The precipitated triazole compound is filtered off from the mother lye, washed with water and dried in the vacuum. The sodium salt of 2-(2"-cyano-stilbyl-4")-(naphtho-1'.2':4.5)-1.2.3-triazole-6'-sulphonic acid is obtained as a yellowish white powder which is difficultly soluble in water. The product is a valuable brightening agent for cellulose fibres, linear polyamide fibres such as nylon etc. as well as for soaps and synthetic washing agents. It lends to these more or less white carriers a pure blueish white shading. It has good fastness to light and chlorine and can be used in textile treatment baths which contain active chlorine without loss of optical brightening effect. Also the after treatment of textile fibres brightened therewith with the usual bleaching baths containing active chlorine does not have an adverse effect on the white shading.

If in the above example, instead of the 2-aminonaphthalene-6-sulphonic acid, 30.3 parts of 2-aminonaphthalene-5.7-disulphonic acid are used and the o-aminoazo dyestuff is oxidised in aqueous solution with a sodium hypochlorite solution to form the triazole compound, then the disodium salt of 2-(2"-cyano-stilbyl-4")-(naphtho-1'.2':4.5)-1.2.3-triazole-5'.7'-disulphonic acid is obtained as a yellowish power which is fairly soluble in water. The product is a valuable brightening agent for cellulose fibres as well as for soaps and synthetic washing agents.

The 4-amino-2-cyano-stilbene used in the above example is produced in the following manner:

25 parts of 4-nitro-2-cyano-stilbene (obtained according to Ullmann, B. 41, 2296) are reduced with 30 parts of etched cast iron filing in a mixture of ethylene glycol monomethyl ether and water. 4-amino-2-cyano-stilbene is obtained as a pale yellowish powder. Recrystallised from alcohol it melts at 125–127°.

*Example 25*

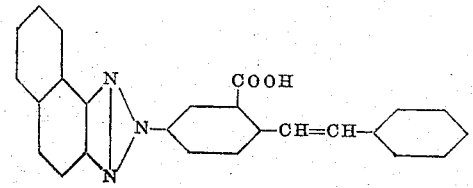

23.9 parts of 4-aminostilbene-2-carboxylic acid are dissolved in 250 parts of 80% acetic acid, 25 parts of concentrated hydrochloric acid and 150 parts of ice are added and the whole is diazotised at 5–8° with an aqueous solution of 6.9 parts of sodium nitrite. A solution, 40–45° warm, of 14.3 parts of 2-aminonaphthalene and 10 parts of concentrated hydrochloric acid in 200 parts of water is added to the well cooled diazo compound, and then an aqueous solution of 40 parts of crystallised sodium acetate is added dropwise at a temperature of 15–18° in such a manner that the reaction of the coupling always remains weakly mineral acid. The o-aminoazo dyestuff is isolated, dissolved at 90–95° in pyridine a mixture of 60 parts of crystallised copper sulphate in 240 parts of water and 120 parts of concentrated ammonia is added and the whole is stirred at 90–95° until the dyestuff is completely oxidised. After cooling, the aqueous layer containing copper salts is separated from the pyridine layer with the addition of sodium chloride, the pyridine layer is washed several times with ammoniacal sodium chloride solution and then the pyridine is distilled off with steam with the addition of 10 parts of sodium hydroxide and 2–5 parts of sodium hydrosulphite. To further purify the product, it is dissolved in hot aqueous ethylene glycol monomethyl ether, filtered hot with the addition of a little animal charcoal and the filtrate is poured into 4–5 times its volume of about a 10% sodium chloride solution. The precipitated product is filtered off, washed with water and dried. The sodium salt of 2-(stilbyl-4″)-(naphtho-1′.2′:4.5)-1.2.3-triazole-2″-carboxylic acid is obtained as a yellowish powder which is difficultly soluble in water. The product is a valuable brightening agent for cellulose, linear polyamide fibres, synthetic materials such as polyvinyl chloride, polyvinylidene chloride, copolymers etc. The brightening attained therewith is distinguished by good fastness properties, in particular a good fastness to chlorine. Also cellulose esters such as cellulose acetate, are brightened by treatment with a soap dispersion of the new product. In addition, the compound can be added to organic solvents which are used for the chemical cleaning of textile fibres. The textile fibres cleaned in this way have a more white appearance.

A compound which also has an optical brightening effect on cellulose fibres is obtained if the 2-aminonaphthalene is replaced by 22.3 parts of 2-aminonaphthalene-6-sulphonic acid. By oxidation of the o-aminoazo dyestuff obtained, the disodium salt of 2-(stilbyl-4″)-(naphtho-1′.2′:4.5)-1.2.3-triazole-2″-carboxylic acid-6′-sulphonic acid is obtained as a yellow powder which dissolves fairly well in water.

The 4-aminostilbene-2-carboxylic acid named in the above example is obtained in the following way:

27 parts of 4-nitro-stilbene-2-carboxylic acid (obtained according to Pfeiffer, B. 44, 1119) are reduced with 30 parts of etched cast iron filings in a mixture of ethylene glycol monomethyl ether and water. 4-aminostilbene-2-carboxylic acid is obtained as a pale yellowish powder.

*Example 26*

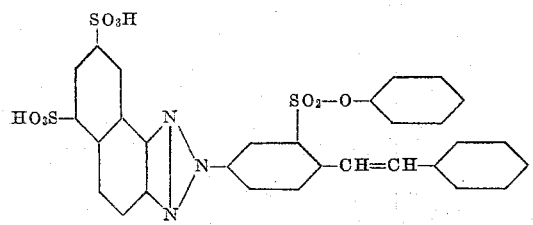

35.1 parts of 4-aminostilbene-2-sulphonic acid phenyl ester with the addition of 25 parts of concentrated hydrochloric acid are dissolved in 120 parts of glacial acetic acid and after the addition of 100 parts of ice, the whole is diazotised at 10–12° with an aqueous solution of 6.9 parts of sodium nitrite. The diazo compound is coupled with an aqueous solution of the sodium salt of 30.3 parts of 2-amino-naphthalene-5.7-disulphonic acid and 25 parts of crystallised sodium acetate. It is of advantage to add 2–5% technical pyridine as solubility promoter. On completion of the coupling, the o-aminoazo dyestuff is isolated, then dissolved in warm pyridine and oxidised to form the triazole compound at 90–95° with a solution of 60 parts of crystallised copper sulphate in 240 parts of water. On completion of the oxidation, the product is cooled to room temperature and 120 parts of concentrated ammonia are added. Then first the copper salts and afterwards the pyridine are separated as described in Example 25. The di-sodium salt of 2-(stilbyl-4″)-(naphtho-1′.2′:4.5)-1.2.3-triazole-2″-sulphonic acid phenyl ester-5′.7′-disulphonic acid is obtained as a yellow powder which is fairly soluble in water. The product is a valuable brightening agent for linear polyamide fibres such as nylon etc. and has similar properties to the compound described in Example 24.

The 4-aminostilbene-2-sulphonic acid phenyl ester used in the above example is produced in the following way:

35.1 parts of 4-nitro-stilbene-2-sulphonic acid phenyl ester are reduced according to Béchamp's process with 30 parts of etched cast iron filings in a mixture of ethylene glycol monomethyl ether and water. 4-aminostilbene-2-sulphonic acid phenyl ester is obtained as a yellowish white powder recrystallised from alcohol, the product melts at 121–123°.

*Example 27*

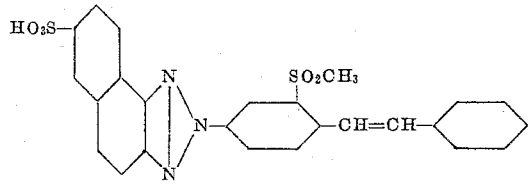

27.3 parts of 4-aminostilbene-2-methyl sulphone with 25 parts of concentrated hydrochloric acid are dissolved warm in 200 parts of glacial acetic acid, 150–200 parts of ice and water are added and the whole is diazotised at 10–12° with an aqueous solution of 6.9 parts of sodium nitrite. The diazo compound is coupled with an aqueous solution of 22.3 parts of 2-aminonaphthalene-6-sulphonic acid, 4.0 parts of sodium hydroxide and 25 parts of chrystallised sodium acetate. On completion of the coupling the dyestuff is isolated and washed. The damp o-aminoazo dyestuff is then dissolved in warm pyridine, a mixture of 60 parts of crystallised copper sulphate in 240 parts of water and 120 parts of ammonia is added and the whole is stirred in a boiling water bath until the dyestuff is completely oxidised. After cooling, the aqueous copper salts-containing layer is separated from the pyridine with the addition of sodium chloride, the pyridine layer is washed several times with ammoniacal sodium chloride solution and then, with the addition of 10 parts of sodium hydroxide and 2–5 parts of sodium hydrosulphite, the pyridine is distilled off with steam. The raw product is further purified by dissolving in hot aqueous dimethyl formamide and filtering hot with the addition of a little animal charcoal. The filtrate is poured into 4–5 times its volume of about a 10% sodium chloride solution, the precipitated product is filtered off, washed with water and dried in the vacuum. The sodium salt of 2-(stilbyl-4″)-(naphtho-1′.2′:4.5)-1.2.3-triazole-2″-methyl sulphone-6′-sulphonic acid is obtained as a yellow powder. It dissolves with difficulty in water but is easily soluble in dimethyl formamide or ethylene glycol monomethyl ether. The product can be used for the brightening of linear polyamide fibres such as nylon. Like the compound described in Example 24, it has good fastness to light and excellent fastness to chlorine.

A product with similar properties is obtained if the 2-aminonaphthalene-6-sulphonic acid in the above example is replaced by 22.3 parts of 2-aminonaphthalene-5-sulphonic acid. The sodium salt of 2-(stilbyl-4″)-(naphtho- 1'.2':4.5)-1.2.3-triazole-2''-methyl sulphone-5'-sulphonic acid is obtained as a yellow powder which is difficultly soluble in water.

If in the above example the 4-aminostilbene-2-methyl sulphone is replaced by 36.3 parts of 4-aminostilbene-2-(1'.3'-dimethylphenyl sulphone) and the o-aminoazo dyestuff obtained is oxidised according to the method described above to form the triazole compound, the sodium salt of 2-(stilbyl-4'')-(naphtho-1'.2':4.5)-1.2.3-triazole-2''-(1.3-dimethylphenyl sulphone)-6'-sulphonic acid is obtained as a yellowish powder. This compound dissolves with difficulty in water but is easily soluble in dimethyl formamide or ethylene glycol monomethyl ether.

By coupling the diazo compound of 4-aminostilbene-2-(1'.3'-dimethylphenyl sulphone) with 30.3 parts of 2-amino-naphthalene-5.7-disulphonic acid and oxidation of the dyestuff to form the triazole compound, the disodium salt of 2-(stilbyl-4'')-(naphtho-1'.2':4.5)-1.2.3-triazole-2''-(1.3-dimethylphenyl sulphone)-5'.7'-disulphonic acid is obtained as a yellow powder which is fairly soluble in water.

The two latter triazole compounds are also valuable brightening agents for linear polyamide fibres such as nylon etc. The brightening effects attained therewith are distinguished by their excellent fastness to chlorine and good fastness to light.

The intermediate products used in the above example can be obtained in the following way:

22.3 parts of the sodium salt of 4-nitro-toluene sulphinic acid are stirred under reflux for 3–4 hours in 100 parts of toluene with 12 parts of dimethyl sulphate and 10 parts of magnesium oxide. The 4-nitro-toluene-2-methyl sulphone so obtained is a white powder and recrystallised from alcohol it melts at 118–120°. 21.5 parts of this 4-nitro-toluene-2-methyl sulphone are condensed with 12 parts of benzaldehyde and 2 parts of piperidine at 145–150° for 4 hours to form 4-nitrostilbene-2-methyl sulphone. Recrystallised from glacial acetic acid, the product is a yellow powder which melts at 196–198°.

30.3 parts of this 4-nitrostilbene-2-methyl sulphone are reduced according to Béchamp's method with 30 parts of etched cast iron filings in a mixture of ethylene glycol monomethyl ether and water. The 4-aminostilbene-2-methyl sulphone is obtained as an orange yellow powder. Recrystallised from alcohol, the compounds melts at 131–133°.

The 4-aminostilbene-2-(1'.3'-dimethylphenyl sulphone) is obtained as follows:

118 parts of 4-nitro-toluene-2-sulphonic acid chloride are heated with 400 parts of m-xylene and 10 parts of ferric chloride under reflux until completion of the splitting off of acid. The excess m-xylene is separated by steam distillation. 71 parts of the 3-nitro-6.2'.4'-trimethyl-1.1'-diphenyl sulphone are condensed with 25 parts of benzaldehyde with the addition of 2 parts of piperidine to form 4-nitrostilbene-2-(1'.3'-dimethylphenyl sulphone). 39.3 parts of this compound are reduced according to Béchamp's method with 30 parts of etched cast iron filings in a mixture of ethylene glycol monomethyl ether and water. 4-aminostilbene-2-(1'.3'-dimethylphenyl sulphone) is obtained as a yellowish powder; recrystallised from a mixture of benzene/benzine it melts at 138–140°.

*Example 28*

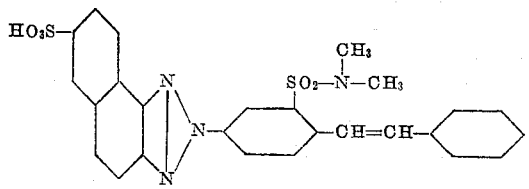

30.2 parts of 4-aminostilbene-2-sulphonic acid dimethyl amide with 25 parts of concentrated hydrochloric acid are dissolved in 300 parts of glacial acetic acid, 150 parts of ice are added and the whole is diazotised at 10–12° with an aqueous solution of 6.9 parts of sodium nitrite. The diazo compound obtained is then coupled with an aqueous solution of 22.3 parts of 2-aminonaphthalene-6-sulphonic acid, 4.0 parts of sodium hydroxide and 25 parts of crystallised sodium acetate. On completion of the coupling, the o-aminoazo dyestuff obtained is dissolved in warm pyridine and, as described in Example 25, oxidised with ammoniacal copper sulphate solution to form the triazole compound and then purified. The sodium salt of 2-(stilbyl-4'')-(naphtho-1'.2':4.5)-1.2.3-triazole-2''-sulphonic acid dimethylamide - 6' - sulphonic acid is obtained as a yellowish powder which dissolves with difficulty in water. The product is a valuable brightening agent for linear polyamide fibres such as nylon. The brightening effects obtained with this compound are distinguished by their excellent fastness to chlorine and a very good fastness to light.

A product with very similar properties is obtained if in the above example the 2-aminonaphthalene-6-sulphonic acid is replaced by 22.3 parts of 2-aminonaphthalene-5-sulphonic acid. The sodium salt of 2-(stilbyl-4'')-(naphtho-1'.2':4.5)-1.2.3-triazole-2''-sulphonic acid dimethylamide-5'-sulphonic acid is obtained as a yellowish powder which is difficultly soluble in water.

The 4-aminostilbene-2-sulphonic acid dimethylamide used in the above example is obtained as follows:

32.4 parts of 4-nitrostilbene-2-sulphonic acid chloride are added while cooling with ice to 100 parts of about 23% aqueous dimethylamine solution and stirred for several hours at 0–5° and then for 1 hour at 60–65°. After cooling, the product is filtered off, washed well with cold water and the precipitate is reduced with 30 parts of cast iron filings and 5 parts of acetic acid in a mixture of ethylene glycol monomethyl ether and water. 4-aminostilbene-2-sulphonic acid dimethylamide is obtained as a yellowish powder. Recrystallised from alcohol, it melts at 134–136°.

*Example 29*

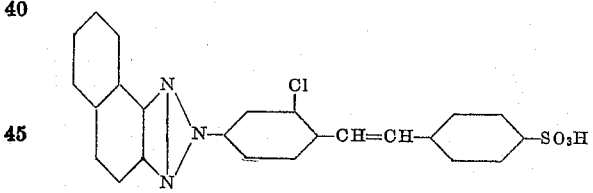

30.95 parts of 4-amino-2-chlorostilbene-4'-sulphonic acid are dissolved with 4.0 parts of sodium hydroxide in water, 6.9 parts of sodium nitrite are added and the whole is indirectly diazotised at 10–12° with 25 parts of concentrated hydrochloric acid. The suspension of the diazo compound is coupled with an aqueous solution of 14.3 parts of 2-aminonaphthalene and 10 parts of concentrated hydrochloric acid, the coupling being performed at 12–15° and the mineral acid reaction of the coupling being gradually neutralised by the addition of an aqueous solution of 40 parts of crystallised sodium acetate. On completion of the coupling, the dyestuff is filtered off and washed. The damp o-aminoazo dyestuff is then dissolved in hot pyridine and oxidised with a mixture of 60 parts of crystallised copper sulphate in 240 parts of water and 120 parts of concentrated ammonia at a temperature of 90–95° to form the triazole compound. The raw product is de-coppered and purified as described in Example 25 and it is dried in the vacuum. In the form of its sodium salt, 2-(2''-chloro-stilbyl-4'')-(naphtho-1'.2':4.5)-1.2.3-triazole-4'''-sulphonic acid is a yellow powder. The compound is difficultly soluble in water, easily soluble in dimethyl formamide or ethylene glycol monomethyl ether and is a valuable brightening agent for linear polyamide fibres such as nylon. Fibres treated with this compound have a pure white shading which has good fastness properties, in particular excellent fastness to chlorine and good fastness to light.

If in the above example the 2-aminonaphthalene is replaced by 22.3 parts of 2-aminonaphthalene-6-sulphonic acid and the o-aminoazo dyestuff obtained is oxidised to form the triazole compound, the disodium salt of 2-(2''-chloro-stilbyl-4'')-(naphtho-1'.2':4.5)-1.2.3-triazole-6'.4'''-disulphonic acid is obtained as a yellowish powder which is easily soluble in water.

This compound draws on to cellulose fibres from diluted aqueous solutions and in daylight lends them a more white appearance. The brightening obtained therewith is distinguished by excellent fastness to chlorine and very good fastness to light.

If the 4-amino-2-chloro-stilbene-4'-sulphonic acid is replaced by 23.05 parts of 4-amino-2-chloro-stilbene, the diazo compound is coupled with 2-aminonaphthalene-6-sulphonic acid and the o-aminoazo dyestuff obtained is oxidised to form the sodium salt of 2-(2''-chloro-stilbyl-4'')-(naphtho-1'.2':4.5)-1.2.3-triazole-6'-sulphonic acid, then an equally valuable brightening agent for linear polyamide fibres such as nylon is obtained.

Also, if the 4-amino-2-chlorostilbene-4'-sulphonic acid is replaced by 22.6 parts of 4-amino-2-methoxy-stilbene, the diazo compound thereof is coupled with 2-aminonaphthalene 6-sulphonic acid and the o-aminoazo dyestuff obtained is oxidised to the corresponding triazole compound, then the sodium salt of 2-(2''-methoxy-stilbyl-4'')-(naphtho-1'.2':4.5)-1.2.3-triazole-6'-sulphonic acid is obtained as a yellow powder which is difficultly soluble in water. The product can be used for the brightening of linear polyamide fibres such as nylon. It lends to fibres treated therewith a more white appearance of greenish-blue shade in daylight.

The 4-aminostilbene compounds used in the above example are obtained according to Meerwein's method (Journal für prakt. Chemie (2), 152, 256 (1939)) as follows:

(a) By reacting the diazo compound from 17.3 parts of 4-nitro-2-chloro-1-aminobenzene with the solution of 22.8 parts of cinnamic acid-4-sulphonic acid, 4 parts of sodium hydroxide, 40 parts of sodium acetate and 10 parts of crystallised copper-II-chloride in 200 parts of water, 4-nitro-2-chloro-stilbene-4'-sulphonic acid is obtained, while splitting off nitrogen and carbon dioxide, which is reduced in aqueous solution with cast iron filings and hydrochloric acid to form 4-amino-2-chlorostilbene-4'-sulphonic acid;

(b) By reacting the same diazo compound with a mixture of the solutions of 14.8 parts of cinnamic acid in 200 parts of acetone and of 40 parts of sodium acetate and 10 parts of copper-II-chloride in 200 parts of water, 4-nitro-2-chlorostilbene is obtained as a yellow powder which is reduced in a mixture of ethylene glycol monomethyl ether and water with cast iron filings and hydrochloric acid to form 4-amino-2-chlorostilbene which is obtained as a pale yellow powder;

(c) By reacting the diazo compound from 16.8 parts of 4-nitro-2-methoxy-1-aminobenzene with 14.8 parts of cinnamic acid under the conditions mentioned in (b) above and reducing the nitro group to the amino group, 4-amino-2-methoxy-stilbene is obtained as a pale yellow powder.

*Example 30*

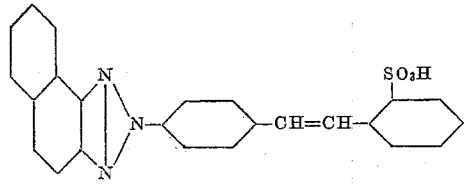

27.5 parts of 4-aminostilbene-2'-sulphonic acid with 4.0 parts of sodium hydroxide are dissolved in water, 6.9 parts of sodium nitrite are added and the whole is indirectly diazotised at 10–12° with 25 parts of concentrated hydrochloric acid. The diazo suspension obtained is coupled at 15–18° with an aqueous solution of 14.3 parts of 2-aminonaphthalene and 10 parts of concentrated hydrochloric acid. The reaction of the coupling is kept weakly mineral acid by the gradual addition of an aqueous solution of 40 parts of crystallised sodium acetate. On completion of the coupling, the dyestuff is filtered off and washed. The damp o-aminoazo dyestuff dissolved in pyridine is poured at 90–95° into a mixture of 60 parts of crystallised copper sulphate in 240 parts of water and 120 parts of concentrated ammonia and the whole is stirred in the water bath until the dyestuff is completely oxidised. After cooling, the aqueous layer containing the copper salts is separated from the pyridine with the addition of sodium chloride, the pyridine layer is washed several times with ammoniacal sodium chloride solution and then the pyridine is distilled off with steam with the addition of 10 parts of sodium hydroxide and 2–5 parts of sodium hydrosulphite. The raw product is further purified by dissolving it in hot aqueous dimethyl formamide and filtering hot with the addition of animal charcoal. The filtrate is poured into 4–5 times its volume of about 10% sodium chloride solution, the precipitated product is filtered off, washed and dried in the vacuum. The sodium salt of 2-(stilbyl-4'')-(naphtho-1'.2':4.5)-1.2.3-triazole-2'''-sulphonic acid is a yellow powder which dissolves with difficulty in water. The compound is a valuable brightening agent for cellulose fibres, linear polyamide fibres such as nylon, as well as for soaps and synthetic washing agents. The brightening effects attained therewith are distinguished by excellent fastness to chlorine and very good fastness to light.

If in the above example, the 2-aminonaphthalene is replaced by a solution of the sodium salt of 22.3 parts of 2-aminonaphthalene-5- or -6-sulphonic acid and 25 parts of crystallised sodium acetate and the o-aminoazo dyestuff obtained is oxidized to form the disodium salt of 2-(stilbyl-4'')-(naphtho-1'.2':4.5)-1.2.3-triazole-2.'''.5'- or -6'-disulphonic acid, then compounds are obtained which also have very valuable properties. These compounds are yellow powders which are easily soluble in water. Their diluted solutions are almost colourless. They draw on to cellulose fibres from aqueous solutions and lend them a more white appearance in daylight. The brightening effects obtained are distinguished by excellent fastness to chlorine and very good fastness to light.

The 4-aminostilbene-2'-sulphonic acid used in this example is obtained in the following manner:

18.3 parts of 4-nitro-phenyl acetic acid, 18.6 parts of 2-sulphobenzaldehyde and 5 parts of piperidine are condensed for 4 hours at 150–160°. 4-nitrostilbene-2'-sulphonic acid is obtained as a yellowish powder. 30.5 parts of 4-nitrostilbene-2'-sulphonic acid in water are reduced according to Béchamp's process with 30 parts of etched cast iron filings. The 4-aminostilbene-2'-sulphonic acid is obtained as a pale yellowish powder.

*Example 31*

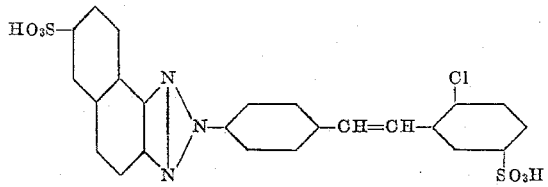

30.95 parts of 4-amino-2'-chlorostilbene-5'-sulphonic acid and 4.0 parts of sodium hydroxide are dissolved in water, 6.9 parts of sodium nitrite are added and the whole is indirectly diazotised at 10–12° with 25 parts of concentrated hydrochloric acid. The diazo suspension so obtained is coupled at 12–15° with an aqueous solution of 22.3 parts of 2-aminonaphthalene-6-sulphonic acid, 4.0 parts of sodium hydroxide and 25 parts of crystallised sodium acetate. On completion of the coupling, the o-aminoazo dyestuff is filtered off and washed. Then the dyestuff is dissolved in hot pyridine as described in Example 30, oxidised at 90–95° with a mixture of 60 parts of crystallised copper sulphate in 240 parts of water and 120 parts of concentrated ammonia to form the triazole compound, whereupon it is de-coppered and purified. The disodium salt of 2-(2'''-chloro-stilbyl-4'')-(naphtho-1'.2':4.5)-1.2.3-triazole-5'''.6'-disulphonic acid is a yellowish powder which is easily soluble in water. From diluted aqueous solutions, the compound draws on to cellulose fibres and lends them a more white appearance in daylight. The brightening effects so obtained are distinguished by excellent fastness to chlorine and very good fastness to light.

A product which has equally valuable properties but is difficultly soluble in water is obtained if the diazo suspension of 4-amino-2'-chlorostilbene-5'-sulphonic acid is coupled with an aqueous solution of 14.3 parts of 2-amino-naphthalene and 10 parts of concentrated hydrochloric acid and the mineral acid reaction of the coupling is neutralised by the gradual addition of an aqueous solution of 40 parts of crystallised sodium acetate and then the o-aminoazo dyestuff obtained is oxidised as described above to form the triazole compound. After purification, the sodium salt of 2-(2'''-chloro-stilbyl-4'')-(naphtho-1'.2':4.5)-1.2.3-triazole-5'''-sulphonic acid is obtained as a yellowish powder. This compound lends to cellulose fibres as well as linear polyamide fibres such as nylon and also soap powders and synthetic washing agents a more white appearance in daylight.

The 4-amino-2'-chlorostilbene-5'-sulphonic acid named in this example is obtained as follows:

18.3 parts of 4-nitrophenyl acetic acid, 22 parts of 2-chlorobenzaldehyde-5-sulphonic acid and 6 parts of piperidine are condensed for 4 hours at 150–160°. 4-nitro-2'-chlorostilbene-5'-sulphonic acid is obtained as a yellowish powder, which is reduced according to Béchamp. The 4-amino-2'-chlorostilbene - 5' - sulphonic acid is a pale yellowish powder.

*Example 32*

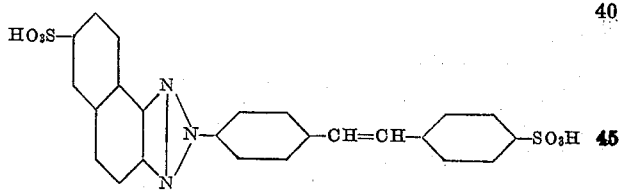

27.5 parts of 4-aminostilbene-4'-sulphonic acid and 4.0 parts of sodium hydroxide are dissolved in water, 6.9 parts of sodium nitrite are added and the whole is indirectly diazotised at 10–12°. The diazo suspension obtained is coupled at 12–15° with an aqueous solution of 22.3 parts of 2-aminonapthalene-6-sulphonic acid, 4.0 parts of sodium hydroxide and 25 parts of crystallised sodium acetate. On completion of the coupling, the dyestuff is salted out, filtered off and washed. Then the damp o-aminoazo dyestuff is dissolved hot with 20 parts of aqueous concentrated ammonia in a 20% aqueous pyridine solution and this solution is coupled with a mixture of 60 parts of crystallised copper sulphate in 240 parts of water and 120 parts of concentrated aqueous ammonia solution and the whole is kept at 90–95° until the dyestuff is completely oxidised. The mixture is then separated by the addition of sodium chloride, the pyridine layer is washed several times with ammoniacal sodium chloride solution and then the pyridine, whilst adding 10 parts of sodium hydroxide and 4–8 parts of sodium hydrosulphite, is distilled off with steam. The raw triazole is further purified by dissolving in hot ethylene glycol monomethyl ether, the hot solution is filtered with the addition of animal charcoal and then the filtrate is poured into 4–5 times its volume of a 10% sodium chloride solution. After filtering off and drying, the disodium salt of 2 - (stilbyl - 4'')-(naphtho-1'.2':4.5)-1.2.3-triazole-4'''.-6-disulphonic acid is obtained as a yellowish powder which dissolves easily in water. The product is a valuable brightening agent for cellulose fibres. The brightening effects obtained therewith are distinguished by excellent fastness to chlorine and very good fastness to light.

If the suspension obtained according to the above example of the diazo compound of 4-aminostilbene-4'-sulphonic acid is coupled with an aqueous solution of 14.3 parts of 2-aminonaphthalene and 10 parts of concentrated hydrochloric acid whilst gradually adding 40 parts of crystallised sodium acetate, then after oxidation of the o-aminoazo dyestuff the sodium salt of 2-(stilbyl-4'')-(naphtho-1'.2':4.5)-1.2.3-triazole-4''-sulphonic acid is obtained as a yellowish powder. It is dissolved in water with difficulty but easily dissolves in ethylene glycol monomethyl ether and dimethyl formamide.

This compound is a valuable brightening agent for cellulose and linear polyamide fibres such as nylon. It lends to these more or less white substrata a more white appearance in daylight. The brightening effects attained therewith are distinguished by excellent fastness to chlorine and very good fastness to light.

The 4-aminostilbene-4'-sulphonic acid used in this example is obtained as follows:

(a) 18.3 parts of 4-nitrophenyl acetic acid, 18.6 parts of 4-sulphobenzaldehyde (obtained by reacting 4-chlorobenzaldehyde with sodium sulphite at 180–185°) and 6 parts of piperidine are condensed for 4 hours at 160–170°. The 4-nitrostilbene-4'-sulphonic acid is obtained as a yellowish powder.

(b) 13.8 parts of 4-nitraniline are reacted according to Meerwein's process under the conditions described in example 29 with 22.8 parts of 4-sulphocinnamic acid to form 4-nitrostilbene-4'-sulphonic acid. 30.5 parts of 4-nitrostilbene-4'-sulphonic acid in water are reduced according to Béchamp's process with 30 parts of etched cast iron filings in the presence of 5 parts of hydrochloric acid. The 4-aminostilbene-4'-sulphonic acid is obtained as a pale yellow powder.

*Example 33*

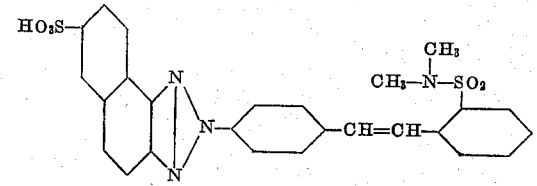

30.2 parts of 4-aminostilbene-2'-sulphonic acid dimethyl amide are dissolved in 100 parts of glacial acetic acid and 25 parts of concentrated hydrochloric acid, 80 parts of ice are added and the whole is diazotised at 10–12° with an aqueous solution of 6.9 parts of sodium nitrite. The diazo compound obtained is then coupled at 12–15° with an aqueous solution of 22.3 parts of 2-aminonaphthalene-6-sulphonic acid, 4.0 parts of sodium hydroxide and 25 parts of crystallised sodium acetate. On completion of the coupling, the o-aminoazo dyestuff is dissolved in hot pyridine and then oxidised at 90–95° with a mixture of 60 parts of crystallised copper sulphate in 240 parts of water and 120 parts of concentrated ammonia to form the triazole compound. The raw product is decoppered and purified as described in Example 25. The sodium salt of 2-(stilbyl-4'')-(naphtho-1'.2':4.5)-1.2.3-triazole-2'''-sulphonic acid dimethylamide-6'-sulphonic acid is obtained as a yellowish powder. The product which is difficultly soluble in water and easily soluble in dimethyl formamide or ethylene glycol monomethyl ether draws from its diluted aqueous solutions onto cellulose and linear polyamide fibres and it gives these substrata a more white appearance in daylight. The brightening effects obtained are distinguished by good fastness to light and excellent fastness to chlorine.

A similar product which is suitable for the brightening of cellulose fibres is obtained if in the above example the 2-aminonaphthalene-6-sulphonic acid is replaced by 30.3 parts of 2-aminonaphthalene-5.7-disulphonic acid. The disodium salt of 2-(stilbyl-4")-(naphtho-1'.2':4.5)-1.2.3-triazole-2'''-sulphonic acid dimethylamide-5'.7'-disulphonic acid obtained is a yellowish powder which is easily soluble in water. The diluted aqueous solutions thereof are practically colourless.

The 4-aminostilbene-2'-sulphonic acid dimethylamide in the above example can also be replaced by 35.6 parts of 4-aminostilbene-2'-sulphonic acid cyclohexylamide. By reacting the diazo compound with 2-aminonaphthalene-6-sulphonic acid and oxidation of the o-aminoazo dyestuff to form the triazole compound, the sodium salt of 2 - (stilbyl-4")-(naphtho-1'.2':4.5)-1.2.3-triazole-2'''-sulphonic acid cyclohexylamide-6'-sulphonic acid is obtained as a yellowish powder. It is difficultly soluble in water and easily soluble in dimethyl formamide or ethylene glycol monomethyl ether. The product is an excellent brightening agent for fibres of linear polyamides such as nylon or Perlon.

A product with similar properties is obtained if the 2-aminonaphthalene-6-sulphonic acid is replaced by 30.3 parts of 2-aminonaphthalene-5.7-disulphonic acid. The disodium salt of 2-(stilbyl-4")-(naphtho-1'.2':4.5)-1.2.3-triazole-2'''-sulphonic acid cyclohexylamide-5'.7'-disulphonic acid is a yellowish powder which is fairly soluble in water.

The 4-aminostilbene-2'-sulphonic acid dimethylamide used in the above example is produced in the following way:

32.7 parts of the sodium salt of the 4-nitrostilbene-2'-sulphonic acid described in Example 30 is added to a mixture of 200 parts of phosphorus oxychloride and 40 parts of phosphorus pentachloride and the whole is stirred for 4 hours at 102–105°. By pouring the reaction mixture into ice and water at a temperature of under 5°, the phosphoric acid halides are decomposed. The precipitated 4-nitrostilbene-2'-sulphonic acid chloride is filtered off, washed well with water and dried in the vacuum at 30–35°.

32.4 parts of 4-nitrostilbene-2'-sulphonic acid chloride are added at 0–5° to 100 parts of about 23% aqueous dimethyl amine solution, whereupon it is stirred for some hours at 0–5° and then for 1 hour at 40–50°. After cooling, the precipitate is filtered off and washed well with cold water. The product obtained is then reduced according to Béchamp's process with 30 parts of cast iron filings in the presence of 5 parts of hydrochloric in a mixture of ethylene glycol monomethyl ether and water. 4-aminostilbene-2'-sulphonic acid dimethylamide is obtained as a pale yellowish powder. Recrystallised from benzene it melts at 121–123°.

If the dimethylamine is replaced by a mixture of 100 parts of water and 25 parts of cyclohexylamine and the 4-nitrostilbene-2'-sulphonic acid cyclohexylamide obtained is reduced, then 4-aminostilbene-2'-sulphonic acid cyclohexylamide is obtained as a pale yellowish powder. Recrystallised from benzene, the product melts at 139–141°.

*Example 34*

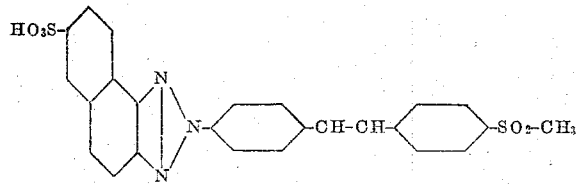

27.3 parts of 4-aminostilbene-4'-methyl sulphone are diazotised as described in Example 33 for 4-aminostilbene-2'-sulphonic acid dimethylamide. By coupling the diazo compound with 2-aminonaphthalene-6-sulphonic acid and oxidising the o-aminoazo dyestuff under the same conditions as in Example 33 to form the triazole compound, the sodium salt of 2-(stilbyl-4")-(naphtho-1'.2':4.5)-1.2.3-triazole-4'''-methyl sulphone-6'-sulphonic acid is obtained as a yellowish powder. The product which is difficultly soluble in water is an excellent brightening agent for cellulose fibres. It can also be used for the brightening of linear polyamide fibres such as nylon etc.

A product with similar properties is obtained if instead of 4-aminostilbene-4'-methyl sulphone, 27.3 parts of 4-aminostilbene-2'-methylsulphone are used. The sodium salt of 2-(stilbyl-4")-(naphtho-1'.2':4.5)-1.2.3-triazole-2'''-methylsulphone-6'-sulphonic acid is obtained as a yellowish powder which is difficultly soluble in water.

(*a*) The 4-aminostilbene-4'-methylsulphone is obtained as follows:

18.4 parts of 4-methylsulphonyl benzaldehyde are condensed for 4 hours at 150–160° with 18.3 parts of 4-nitrophenyl acetic acid and 2 parts of piperidine. 4-nitrostilbene-4'-methylsulphone is obtained as a yellow powder. Recrystallised from glacial acetic acid, it melts at 235–237°. 30.3 parts of this 4-nitrostilbene-4'-methylsulphone are reduced according to Béchamp's process in a mixture of ethylene glycol monomethyl ether and water. The 4-aminostilbene-4'-methyl sulphone is a yellowish powder.

(*b*) The 4-aminostilbene-2'-methyl sulphone is obtained in the following manner:

32.4 parts of 4-nitrostilbene-2'-sulphonic acid chloride with a solution of 32 parts of sodium sulphite and 5 parts of sodium hydroxide in 200 parts of water are converted at 20–30° into the sodium salt of 4-nitrostilbene-2'-sulphinic acid. The sodium hydroxide is added over several hours in such a way that the reaction mixture has always a weakly phenolphthalkaline reaction. 31.1 parts of the sodium salt of 4-nitrostilbene-2'-sulphinic acid in 200 parts of xylene are then stirred for 4–5 hours under reflux with 20 parts of dimethyl sulphate and 20 parts of magnesium oxide. The 4-nitrostilbene-2'-methyl sulphone obtained is a yellow powder which, recrystallised from alcohol, melts at 147–149°. If 30.3 parts of this 4-nitrostilbene-2'-methyl sulphone are reduced according to Béchamp's method in a mixture of ethylene glycol monomethyl ether and water with 30 parts of etched cast iron filings, then 4-aminostilbene-2'-methyl sulphone is obtained as a yellow powder. Recrystallised from alcohol, it melts at 147–149°.

*Example 35*

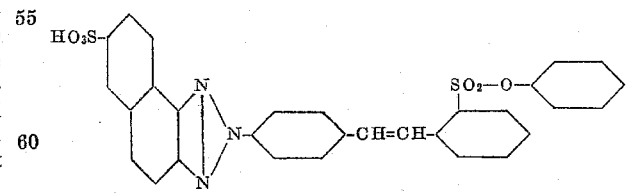

35.1 parts of 4-aminostilbene-2'-sulphonic acid phenyl ester are diazotised, coupled with 2-aminonaphthalene-6-sulphonic acid and the o-aminoazo dyestuff obtained is oxidised to form the triazole compound under the conditions given in Example 33. The sodium salt of 2-(stilbyl - 4") - (naphtho-1'.2':4.5)-1.2.3-triazole-2'''-sulphonic acid phenyl ester-6'-sulphonic acid is obtained as yellowish powder which is diffcultly soluble in water. The product is a valuable brightening agent for linear polyamide fibres such as nylon.

The 4-aminostilbene-2'-sulphonic acid phenyl ester is obtained as follows:

32.4 parts of 4-nitrostilbene-2'-sulphonic acid chloride are slowly added at 60–65° to a mixture of 10 parts of phenol, 4.5 parts of sodium hydroxide and 20 parts of water while keeping the reaction phenolphthalein alkaline. The whole is then stirred for 1 hour at a temperature of 60–65° then cooled, the precipitate is filtered off and washed well with water. After drying in the vacuum, the 4-nitrostilbene-2'-sulphonic acid phenyl ester is a pale brownish powder.

35.1 parts of this 4-nitrostilbene-2'-sulphonic acid phenyl ester are reduced according to Béchamp's process in a mixture of ethylene glycol monomethyl ether and water with 30 parts of etched cast iron filings. 4-aminostilbene-2'-sulphonic acid phenyl ester is obtained as a yellowish resinous mass.

*Example 36*

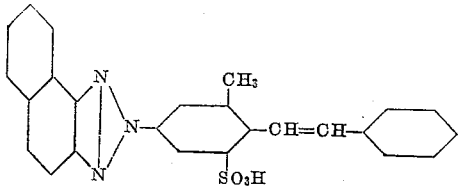

28.9 parts of 4-amino-6-methylstilbene-2-sulphonic acid are dissolved with 4.0 parts of sodium hydroxide in 300 parts of water, 6.9 parts of sodium nitrite are added and the whole is indirectly diazotised at 10–12° with 25 parts of concentrated hydrochloric acid. The diazo suspension obtained is coupled at 10–12° with a solution of 14.3 parts of 2-aminonaphthalene and 10 parts of concentrated hydrochloric acid in 250 parts of water and the strong mineral acid reaction of the mixture is neutralised by the gradual addition of 40 parts of crystallised sodium acetate. On completion of the coupling, the o-aminoazo dyestuff is filtered off and washed. The dyestuff is then dissolved in 300 parts of hot pyridine, a mixture of 60 parts of crystallised copper sulphate in 240 parts of water and 120 parts of concentrated ammonia is added and the whole is stirred at 90–95° until the dyestuff is completely oxidised. The copper salts are separated and the raw product is purified as described in Example 25. The sodium salt of 2-(6"-methyl-stilbyl-4")-(naphtho-1'.2':4.5)-1.2.3-triazole-2"-sulphonic acid as a yellow powder which is difficultly soluble in water but easily soluble in dimethyl formamide or ethylene glycol monomethyl ether. The new triazole compound is an excellent agent for the brightening of linear polyamide fibres such as nylon. The white shading obtained therewith has excellent fastness to chlorine and very good fastness to light.

A product which is more easily soluble in water is obtained if the diazo suspension obtained according to the above example is coupled with an aqueous solution of 22.3 parts of 2-aminonaphthalene-5-sulphonic acid, 4.0 parts of sodium hydroxide and 25 parts of crystallised sodium acetate and the o-aminoazo dyestuff is oxidised to form the triazole compound. The disodium salt of 2 - (6" - methyl-stilbyl-4")-(naphtho-1'.2':4.5)-1.2.3-triazole-2".5'-disulphonic acid is obtained as a yellowish powder.

A product with almost the same properties is obtained if the 2-aminonaphthalene-5-sulphonic acid is replaced by 22.3 parts of 2-aminonaphthalene-6-sulphonic acid. The disodium salt of 2-(6"-methyl-stilbyl-4")-(naphtho-1'.2':4.5)-1.2.3-triazole-2".6'-disulphonic acid is also a yellowish powder which dissolves well in water.

The two latter compounds draw from their aqueous solutions onto more or less white linear polyamide fibres such as nylon or Perlon and lend them a beautiful white shading which has excellent fastness to chlorine and very good fastness to light.

*Example 37*

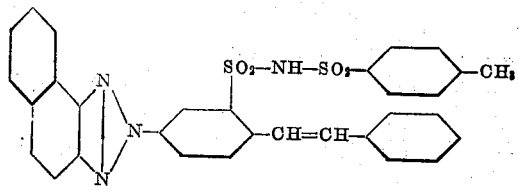

42.8 parts of 4-aminostilbene-2-(p-methyl-phenyl)-disulphimide are dissolved in water with 4.0 parts of sodium hydroxide, 6.9 parts of sodium nitrate are added and the whole is indirectly diazotised at 10–12° with 25 parts of concentrated hydrochloric acid. The diazo suspension obtained in coupled at 12–15° with a solution of 14.3 parts of 2-aminonaphthalene and 10 parts of concentrated hydrochloric acid in 250 parts of water and the strong mineral acid reaction of the mixture is kept in the weak mineral acid range by the addition of about 40 parts of crystallised sodium acetate. On completion of the coupling, the o-aminoazo dyestuff is filtered off, washed and then dissolved in 500 parts of warm pyridine. A mixture of 60 parts of crystallised copper sulphate in 240 parts of water and 120 parts of concentrated ammonia is added and the whole is stirred at a temperature of 90–95° to complete the oxidation of the dyestuff. After cooling, the layer containing the copper salts is separated from the pyridine with the addition of sodium chloride, the pyridine layer is washed several times with ammoniacal sodium chloride solution and then, with the addition of 10 parts of sodium hydroxide and 3–6 parts of sodium hydrosulphite, the pyridine is distilled off. The precipitated product is filtered off and washed with warm water. To further purify the raw product it is dissolved in hot aqueous dimethyl formamide and filtered hot while adding animal charcoal. The solution obtained is then poured into 4–5 times its volume of about 10% sodium chloride solution, the precipitated product is filtered off, washed with water and dried. The sodium salt of 2-(stilbyl-4")-(naphtho-1'.2':4.5)-1.2.3-triazole-2"-(p-methyl phenyl)-disulphimide is obtained as a yellowish powder which is difficultly soluble in water but easily soluble in ethylene glycol monomethyl ether or dimethyl formamide. This product is an excellent brightening agent for linear polyamide fibres such as nylon or Perlon. After treatment with aqueous solutions of the new triazole compound, the more or less yellowish substrata have a more white appearance in daylight. The white shading is distinguished by excellent fastness to chlorine and good fastness to light.

A more easily soluble and also good brightening compound is obtained if the diazo compound named in the above example is coupled with an aqueous solution of 22.3 parts of 2-amino-naphthalene-6-sulphonic acid, 4.0 parts of sodium hydroxide and 25 parts of crystallised sodium acetate. By oxidising the o-aminoazo dyestuff in aqueous solution with a mixture of 60 parts of crystallised copper sulphate in 240 parts of water and 120 parts of concentrated ammonia in aqueous solution, after working up and purifying, the disodium salt of 2-(stilbyl-4")-(naphtho - 1'.2':4.5)-1.2.3-triazole-2"-(p-methyl-phenyl)-disulphimide-6'-sulphonic acid is obtained as a yellowish powder.

If the 4 - aminostilbene - 2-(p-methyl-phenyl)-disulphimide is replaced by 41.1 parts of 4-aminostilbene-2-phenyl disulphimide or by 44.8 parts of 4-aminostilbene-2-(p-chloro-phenyl)-disulphimide and the diazo suspension obtained is coupled with an aqueous solution of 14.3 parts of 2-aminonaphthalene and 10 parts of concentrated hydrochloric acid, the reaction being kept weakly mineral acid, then after oxidation of the corresponding o-aminoazo dyestuff 2-(stilbyl-4")-(naphtho-1'.2':4.5)-1.2.3-triazole-2"-phenyl disulphimide or -2"-(p-chloro-phenyl)-disulphimide is obtained. These compounds, in the form of the sodium salt, are yellowish powders which are difficultly soluble in water. They are very valuable brightening agents for linear polyamide fibres such as nylon or Perlon. Products with a similar action are obtained if the 4-aminostilbene-2-(p-methyl-phenyl)-disulphimide is replaced by 35.2 parts of 4-aminostilbene-2-methyl disulphimide or by 39.3 parts of 4-aminostilbene-2-benzoyl sulphimide. The 2-(stilbyl-4″)-(naphtho-1′.2′:4.5)-1.2.3-triazole-2″-methyl disulphimide, or 2-(stilbyl-4″)-(naphtho-1′.2′:4.5)-1.2.3-triazole-2″-benzoyl sulphimide obtained are also yellowish compounds which are difficultly soluble in water.

Compounds which are more easily soluble in water are obtained if the diazo compounds of 4-aminostilbene-2-phenyl disulphimide, or of -2-(p-chloro-phenyl)-disulphimide or of -2-methyl disulphimide or of -2-benzoyl sulphimide are reacted with an aqueous solution of 22.3 parts of 2-aminonaphthalene-6-sulphonic acid, 4.0 parts of sodium hydroxide and 25 parts of crystallised sodium acetate. By oxidation of the o-aminoazo dyestuff the disodium salts of 2-(stilbyl-4″)-(naphtho-1′.2′:4.5)-1.2.3-triazole-2″-phenyl disulphimide-6′-sulphonic acid or of -2″-(p-chlorophenyl)-disulphimide-6′-sulphonic acid or of -2″-methyldisulphimide-6′-sulphonic acid or of -2″-benzoyl sulphimide-6′-sulphonic acid are obtained as yellowish powders.

The aminostilbene compounds used in the above example are obtained as follows:

32.4 parts of 4-nitrostilbene-2-sulphonic acid chloride are added while cooling with ice to 100 parts of an aqueous 5% ammonia solution, the whole is stirred for some hours at 0–5° and then for 1 hour at 60–65°. After cooling, the reaction product is filtered off, washed well with cold water and then dried. 4-nitrostilbene-2-sulphamide is a yellowish powder.

30.5 parts of this 4-nitrostilbene-2-sulphamide is stirred at 70–80° in a mixture of ethylene glycol monomethyl ether and water with 21 parts of p-toluene sulphochloride and 9–10 parts of sodium hydroxide. The 4-nitrostilbene-2-(p-methyl-phenyl)-disulphimide so obtained is reduced according to Béchamp's process with 30 parts of cast iron filings in a mixture of ethylene glycol monomethyl ether and water to form 4-aminostilbene-2-(p-methyl-phenyl)-disulphimide. The product, after drying, is a yellowish powder.

The other compounds named are obtained by replacing the p-toluene sulphochloride by 18 parts of benzene sulphochloride or 23 parts of 4-chlorobenzene sulphochloride or 12 parts of methyl sulphochloride. To produce 4-nitrostilbene-2-benzoyl sulphimide, 4-nitrostilbene-2-sulphamide is reacted with benzoyl chloride in pyridine and the nitro group is reduced to the amino group.

*Example 38*

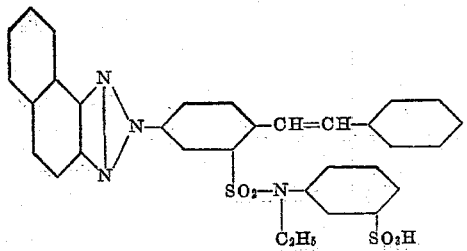

160 parts of phosphorus pentachloride are added to 1000 parts of phosphorus oxychloride and then 226 parts of the sodium salt of 2-(stilbyl-4″)-(naphtho-1′.2′:4.5)-1.2.3-triazole-2″-sulphonic acid are added in small portions within 30 minutes to an hour. The semi-liquid mass is heated and stirred at a temperature of 102–105° for 3 hours. While stirring well, the reaction mass is poured into 2000 parts of water and about 3000 parts of ice in such a way that the temperature does not exceed +5°. After complete decomposition of the phosphoric acid halides, the product which separates is filtered off and washed well with about 5000 parts of water. It is dried at 30–35° in the vacuum until the weight is constant. 2-(stilbyl-4″)-(naphtho-1′.2′:4.5)-1.2.3-triazole-2″-sulphonic acid chloride is a yellowish powder which melts at 198–200°.

44.6 parts of this 2-(stilbyl-4″)-(naphtho-1′.2′:4.5)-1.2.3-triazole-2″-sulphonic acid chloride are pasted in 400 parts of nitrobenzene, coupled with a solution of the sodium salt of 20.2 parts of N-monoethylaminobenzene-3-sulphonic acid and 20 parts of crystallised sodium acetate and then the whole is stirred at 40–42° for 3 hours and for a further 3 hours at 90–95°. During this time the reaction of the mixture is kept in the weak acetic acid to neutral range by the addition of an aqueous solution of sodium carbonate. On completion of the reaction, the nitrobenzene is distilled off with steam, after cooling, the precipitated product is filtered off, washed with cold water and dried in the vacuum. The sodium salt of [2-(stilbyl-4″) - (naphtho - 1′.2′:4.5) - 1.2.3 - triazole - 2″ - sulph-N-ethylamido]-1-benzene-3-sulphonic acid is obtained as a pale yellowish powder. The product is an excellent agent for the brightening of cellulose fibres. The blueish brightening effects obtained therewith have excellent fastness to chlorine and good fastness to light.

Compounds with similar properties are obtained if the N-monoethylamino-benzene-3-sulphonic acid is replaced either by 13.7 parts of 4-aminobenzene-1-carboxylic acid or by 22.3 parts of 2-aminonaphthalene-6-sulphonic acid. The sodium salt of [2-(stilbyl-4″)-(naphtho-1′.2′:4.5)-1.2.3 - triazole - 2″ - sulphamido] - 1 - benzene - 4 - carboxylic acid or of [2-(stilbyl-4″)-(naphtho-1′.2′:4.5)-1.2.3 - triazole - 2″ - sulphamido] - 2 - naphthalene-6-sulphonic acid is obtained as yellowish powders which are fairly difficult to dissolve in water.

*Example 39*

White cotton poplin is treated for 15 minutes at 40° in a bath of 0.03% of the stilbyl-naphthotriazole obtained according to Example 1 (calculated on the weight of the fibres) in the presence of 5% Glauber's salt (calculated on the weight of the fibres). Liquor ratio, 1:50. After rinsing and drying, the treated material has a definitely more white appearance than before the treatment.

*Example 40*

1 part of white household goods, e. g. pillow cases, sheets etc. are washed in the usual way at 90–100° in 10 parts of a liquor containing 3 g. of curd soap, 2 g. of soda, and 0.003 g. of the stilbyl-naphthortriazole obtained according to Example 1. The goods are then rinsed and dried. A dazzling white wash is obtained which has no unpleasant reddish tinge.

*Example 41*

100 parts of curd soap are homogenously mixed with 0.05 part of the brightening agent obtained according to example 1. The soaps or soap powders treated with stilbyl-naphthotriazole have a much whiter appearance in daylight than the untreated products.

*Example 42*

1 part of white household goods is washed in the usual way at 90–100° in 10 parts of a wash liquor containing 3 g. of the curd soap homogenously mixed with the brightening agent according to Example 41 and 2 g. of soda per litre. The goods are rinsed and dried. A dazzling white wash is obtained which has no unpleasant reddish tinge.

*Example 43*

25 parts of previously bleached wool yarn of a slightly yellowish appearance is treated for 30 minutes at 50–60° in a bath (liquor ratio 1:30) containing 0.04 part of the brightening agent according to Example 5 and 2.5 parts of Glauber's salt, calculated on the weight of the fibres. The goods are then rinsed and dried. Yarn so treated has a much whiter appearance than untreated yarn.

*Example 44*

10 parts of weakly yellow nylon are dyed in a dyebath (liquor ratio 1:40) for 30 minutes at 80–90° containing 0.04 part of the brightening agent according to Example 5 (calculated on the weight of the fibre). The goods are rinsed in cold water and dried in the air. Material so treated has a much whiter appearance than untreated material.

This application is in part a continuation of copending application, Ser. No. 268,695, filed January 28, 1952 (and abandoned since the filing of the present application).

What we claim is:

1. A 2-stilbyl monotriazole compound which corresponds to the formula

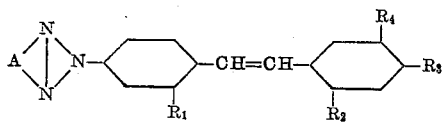

wherein A represents a naphthalene radical, two vicinal carbon atoms of which form part of the 1,2,3-triazole ring, $R_1$ represents a member selected from the group consisting of H, CN, COOH and —$SO_2X$; $R_2$ represents a member selected from the group consisting of H, halogen, lower alkyl, lower alkoxy and —$SO_2X$; $R_3$ represents a member selected from the group consisting of H, halogen, lower alkyl, lower alkoxy, phenyl, phenoxy, CN and —$SO_2X$; $R_4$ represents a member selected from the group consisting of H, —$SO_2X$, CN and lower alkoxy; X is a member selected from the group consisting of hydroxy, lower alkyl, phenylamino, alkylamino, acylamino and phenoxy; and wherein at least one of the substituents $R_1$, $R_2$ and $R_3$ is a negative substituent, and at least one and not more than three substituents are salt-forming groups having an acid reaction in water, the stilbyl monotriazole compound being free from substituents imparting dyestuff characteristics thereto.

2. A 2-stilbyl monotriazole compound which corresponds to the formula

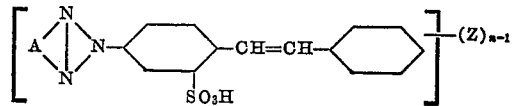

wherein A represents a naphthalene radical, two vicinal carbon atoms of which form part of the 1,2,3-triazole ring, Z represents a salt-forming group having an acid reaction in water, and $n$ is a whole number from 1 to 3 inclusive, said triazole compound being free from substituents imparting dyestuff characteristics.

3. As an optical bleaching agent a monotriazole compound of the formula:

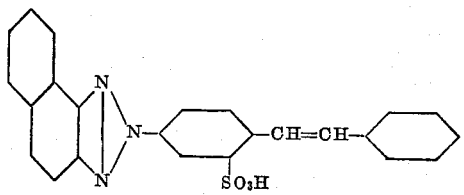

4. As an optical bleaching agent a monotriazole compound of the formula:

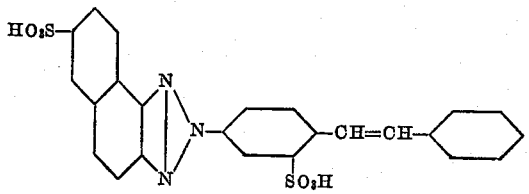

5. As an optical bleaching agent a monotriazole compound of the formula:

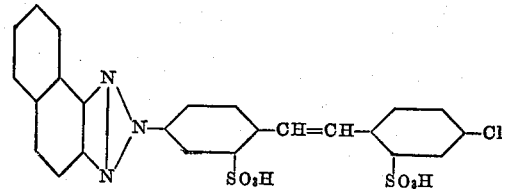

6. As an optical bleaching agent a monotriazole compound of the formula:

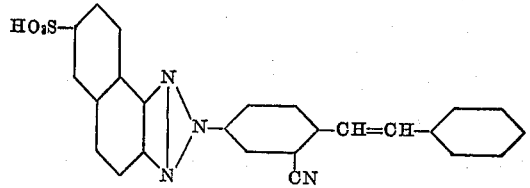

7. As an optical bleaching agent a monotriazole compound of the formula:

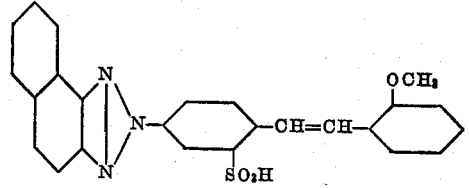

References Cited in the file of this patent

UNITED STATES PATENTS

| | | |
|---|---|---|
| 2,666,062 | Brunner et al. | Jan. 12, 1954 |
| 2,668,777 | Gold et al. | Feb. 9, 1954 |
| 2,713,057 | Zweidler et al. | July 12, 1955 |

OTHER REFERENCES

Charrier: Chem. Abst., vol. 24, p. 366 (1930).